(12) United States Patent
Pagani

(10) Patent No.: US 10,215,652 B2
(45) Date of Patent: Feb. 26, 2019

(54) MICROELECTROMECHANICAL SENSING STRUCTURE FOR A PRESSURE SENSOR INCLUDING A DEFORMABLE TEST STRUCTURE

(71) Applicant: STMICROELECTRONICS S.R.L., Agrate Brianza (IT)

(72) Inventor: Alberto Pagani, Nova Milanese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 139 days.

(21) Appl. No.: 15/475,924

(22) Filed: Mar. 31, 2017

(65) Prior Publication Data

US 2017/0205300 A1 Jul. 20, 2017

Related U.S. Application Data

(62) Division of application No. 14/656,391, filed on Mar. 12, 2015, now Pat. No. 9,752,944.

(30) Foreign Application Priority Data

Mar. 12, 2014 (IT) .............................. TO2014A0193

(51) Int. Cl.
*G01L 9/00* (2006.01)
*G01L 27/00* (2006.01)

(52) U.S. Cl.
CPC .......... *G01L 9/0054* (2013.01); *G01L 9/0052* (2013.01); *G01L 9/0055* (2013.01); *G01L 27/002* (2013.01); *Y10T 29/42* (2015.01)

(58) Field of Classification Search
CPC ..... G01L 19/147; G01L 9/0042; G01L 19/04; G01L 9/0072; G01L 13/025; G01L 9/0054; G01L 9/0075; G01L 19/0038; G01L 19/0084; G01L 19/14; G01L 19/0069; G01L 19/0618; G01L 19/0645; G01L 9/0052; G01L 9/0055; G01L 9/0073; G01L 19/0092; G01L 19/143; G01L 9/0051; G01L 11/025; G01L 19/0046; G01L 19/06; G01L 19/0627; G01L 19/0681; G01L 9/00; G01L 9/0041; G01L 9/0044; G01L 11/04;
(Continued)

(56) References Cited

U.S. PATENT DOCUMENTS 4,708,012 A 11/1987 Folk et al.
4,756,193 A 7/1988 Luettgen
(Continued)

FOREIGN PATENT DOCUMENTS

| DE | 10 2012 215 239 A1 | 3/2014 |
|---|---|---|
| JP | 4016781 B2 | 12/2007 |
| WO | 2012/072347 A1 | 6/2012 |

OTHER PUBLICATIONS

Lapadatu et al., "A new concept for a self-testable pressure sensor based on the bimetal effect," *Sensors and Actuators* 82:69-73, 2000.

*Primary Examiner* — Andre J Allen
(74) *Attorney, Agent, or Firm* — Seed IP Law Group LLP

(57) ABSTRACT

A microelectromechanical sensing structure having a membrane region including a membrane that undergoes deformation as a function of a pressure and a first actuator that is controlled in a first operating mode and a second operating mode, the first actuator being such that, when it operates in the second operating mode, it contacts the membrane region and deforms the membrane in a way different from when it operates in the first operating mode.

25 Claims, 26 Drawing Sheets

(58) Field of Classification Search
CPC .............. G01L 19/0007; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/10; G01L 19/141; G01L 19/145; G01L 19/146; G01L 1/142; G01L 1/18; G01L 1/2262; G01L 1/2287; G01L 1/246; G01L 1/26; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16

USPC ................................................... 73/700–756
See application file for complete search history.

(56) References Cited

U.S. PATENT DOCUMENTS

| | | |
|---|---|---|
| 5,355,712 A | 10/1994 | Petersen et al. |
| 6,688,156 B2 | 2/2004 | Dietrich et al. |
| 6,815,961 B2 | 11/2004 | Mok et al. |
| 7,073,254 B2 | 7/2006 | Eldridge et al. |
| 7,918,138 B2 | 4/2011 | Jiang et al. |
| 9,148,726 B2 | 9/2015 | Dehe |
| 2002/0178826 A1 | 12/2002 | Mannhart |
| 2006/0186766 A1 | 8/2006 | Tsukamoto |
| 2009/0027352 A1 | 1/2009 | Abele |
| 2010/0224985 A1 | 9/2010 | Michael et al. |
| 2013/0050290 A1 | 2/2013 | Andersson et al. |
| 2016/0027988 A1 | 1/2016 | Nagahata |
| 2016/0176702 A1 | 6/2016 | Pagani et al. |

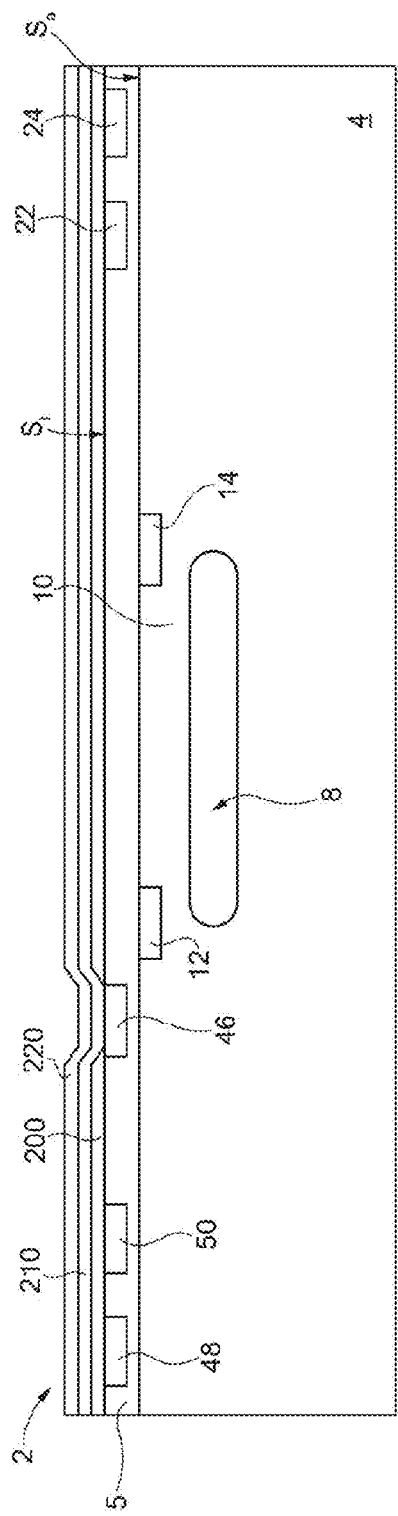
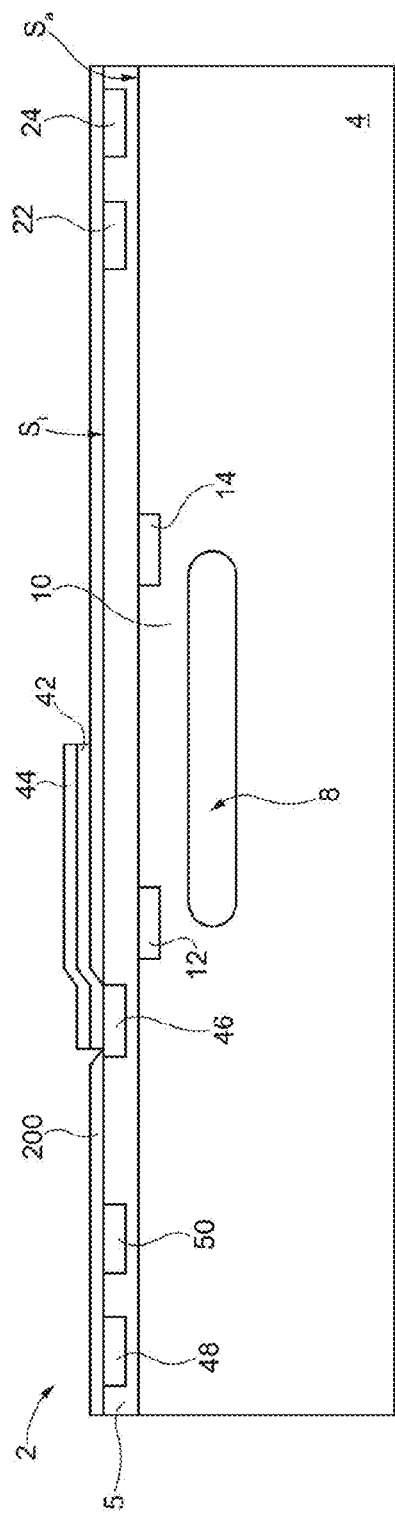
FIG. 27
FIG. 28

MICROELECTROMECHANICAL SENSING STRUCTURE FOR A PRESSURE SENSOR INCLUDING A DEFORMABLE TEST STRUCTURE

BACKGROUND

Technical Field

The present disclosure relates to a microelectromechanical sensing structure for a pressure sensor, which includes a test structure that is at least in part deformable.

Description of the Related Art

As is known, there are today available pressure sensors such as, for example, the so-called sensors of the MEMS (microelectromechanical systems) type.

Each MEMS pressure sensor comprises a sensitive structure of a MEMS type and a reading electronics.

The sensitive structure, which is also known as "sensing structure", typically forms a cavity delimited in part by a membrane and is designed to generate an electrical quantity (for example, a capacitive or resistive variation) indicating a pressure. Instead, the reading electronics are designed to carry out appropriate operations of processing of this electrical quantity for supplying an electrical output signal, whether analog (for example, a voltage) or digital. The electrical output signal is then made available, possibly after prior further processing by an electronic interface circuit, to an external electronic system, such as for example the microcontroller of an electronic apparatus that incorporates the pressure sensor.

In greater detail, typically the sensing structure comprises two or more piezoresistive elements, which are arranged in the proximity of the membrane. In this way, the piezoresistive elements undergo deformation following upon deformation of the membrane, and thus modify their own values of resistance as a function of the deformation of the membrane, and consequently of the pressure exerted on the membrane itself.

Given this, there is particularly felt the need to be able to effectively test the aforementioned sensing structures. In this connection, automatic test equipment (ATE) is known, which is designed to test a number of sensing structures, provided, for example, in a same wafer of semiconductor material. For instance, some test systems envisage exerting forces on the membrane, thus from above the wafer, or else applying a pressure from beneath the wafer. Again, other systems envisage arranging the sensing structure in an environment the pressure of which may be varied in a controlled way. Purely by way of example, U.S. Pat. No. 4,708,012 describes a test system that enables exertion of a pressure on a diaphragm for simulating the presence of a desired pressure, and determination of whether the corresponding electrical output signal assumes correct values. In general, the test systems so far known enable effective testing of sensing structures of a known type; however, according to the cases, they may be characterized by a reduced capacity to parallelize the test, or else by high costs.

BRIEF SUMMARY

One embodiment of the present disclosure is directed to a microelectromechanical sensing structure that includes a membrane region including a membrane that is configured to undergo deformation as a function of a pressure. The sensing structure includes a first actuator that is configured to be controlled in a first operating mode and a second operating mode, said first actuator being configured to operate when in the second operating mode to deform and contact the membrane region and said first actuator being configured to operate when in the first operating mode to deform the membrane in a way different from when in the second operating mode.

Another embodiment of the present disclosure is directed to a system that includes a first die and a sensor formed in the first die. The sensor includes a first cavity, a membrane over the first cavity, a first actuator over the membrane, the first actuator being configured to operate in a first operating mode and in a second operating mode, and a cap over the first actuator and over the membrane. There is a second cavity formed by the cap, the first actuator being in the second cavity.

BRIEF DESCRIPTION OF THE SEVERAL VIEWS OF THE DRAWINGS

For a better understanding of the present disclosure, preferred embodiments thereof are now described, purely by way of non-limiting example and with reference to the attached plates of drawings, wherein:

FIG. 22b shows a block diagram of an electronic system including the pressure sensor illustrated in FIG. 22a;

FIGS. 23-29 are schematic cross-sections of an embodiment of the present sensing structure during successive steps of a manufacturing process; and FIGS. 30-33 are schematic cross-sections of a further embodiment of the present sensing structure during successive steps of a manufacturing process.

DETAILED DESCRIPTION

Figure 1:
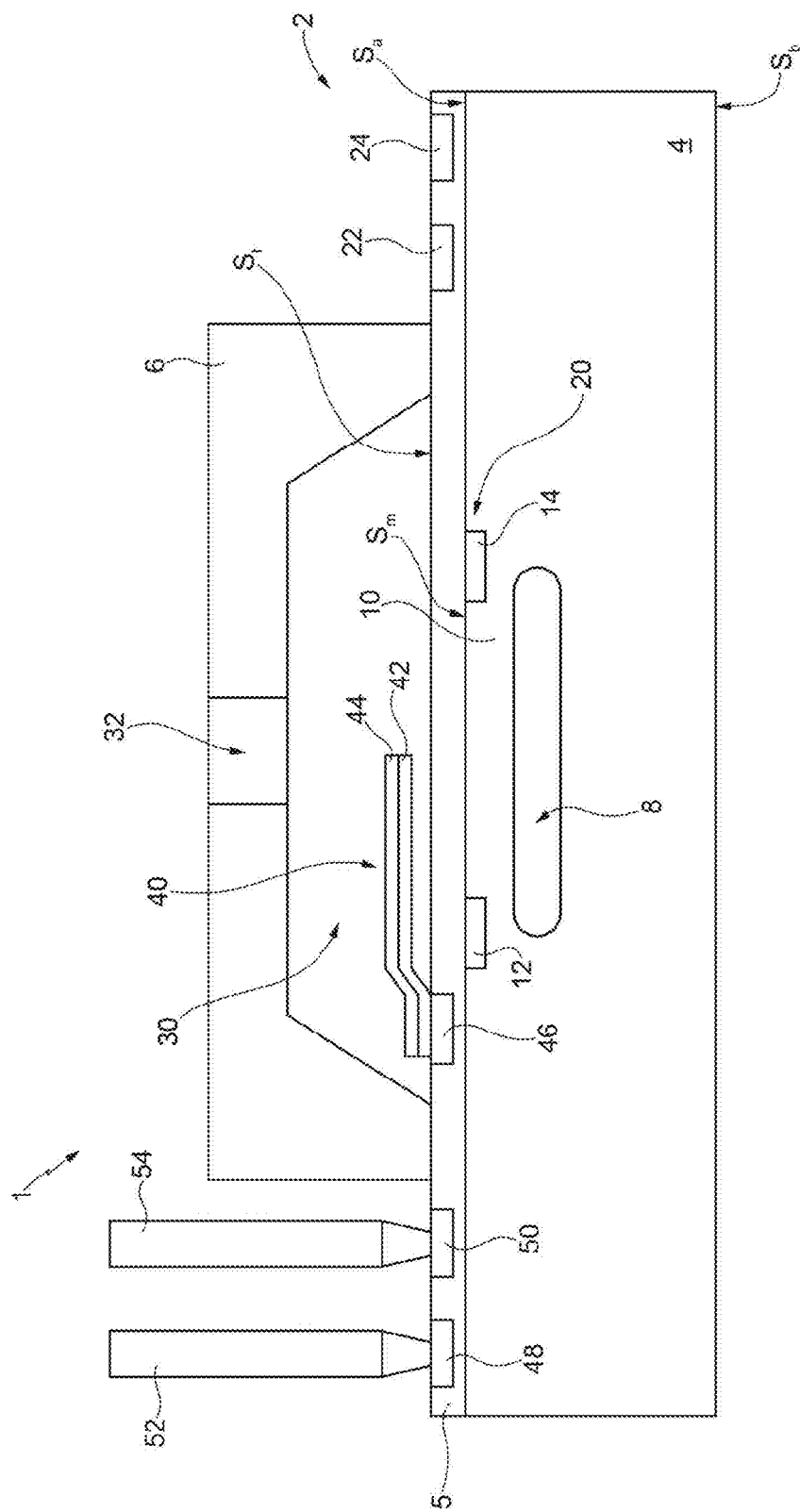
FIGS. 1 and 3 are schematic cross-sections of an embodiment of the present sensing structure in two different operating conditions.

FIG. 1 shows a pressure sensor 1, which comprises a sensing structure 2, which includes a semiconductor body 4, a top region 5, and a cap 6.

The semiconductor body 4 comprises a substrate (not shown) and may further comprise one or more epitaxial layers (not shown). In addition, the semiconductor body 4 delimits a cavity 8 of a buried type, referred to herein as "sensing cavity" 8. In particular, without this implying any loss of generality, the semiconductor body 4 forms a membrane 10, which delimits the sensing cavity 8 at the top and is designed to undergo deformation as a function of the pressure exerted on the membrane itself.

The semiconductor body 4 is delimited at the top and at the bottom by a top surface 5, and a bottom surface $S_b$, respectively, referred to hereinafter as "top body surface" $S_a$ and "bottom body surface" $S_b$. Furthermore, the top body surface $S_a$ forms the surface that delimits the membrane 10 at the top, i.e., the surface of the membrane opposite to the sensing cavity 8, referred to hereinafter as "membrane surface" $S_m$.

The top region 5 extends on the semiconductor body 4, with which it is in direct contact; thus it also extends on the membrane 10. Consequently, the top region 5 contacts the top body surface $S_a$; further, the top region 5 is delimited at the top by a top region surface $S_t$.

In greater detail, the top region 5 may be of dielectric material; for example, the top region 5 may be formed by one or more dielectric layers (not shown). Within the top region 5 there may further extend metallizations (not shown) in a per se known manner.

Figure 4:
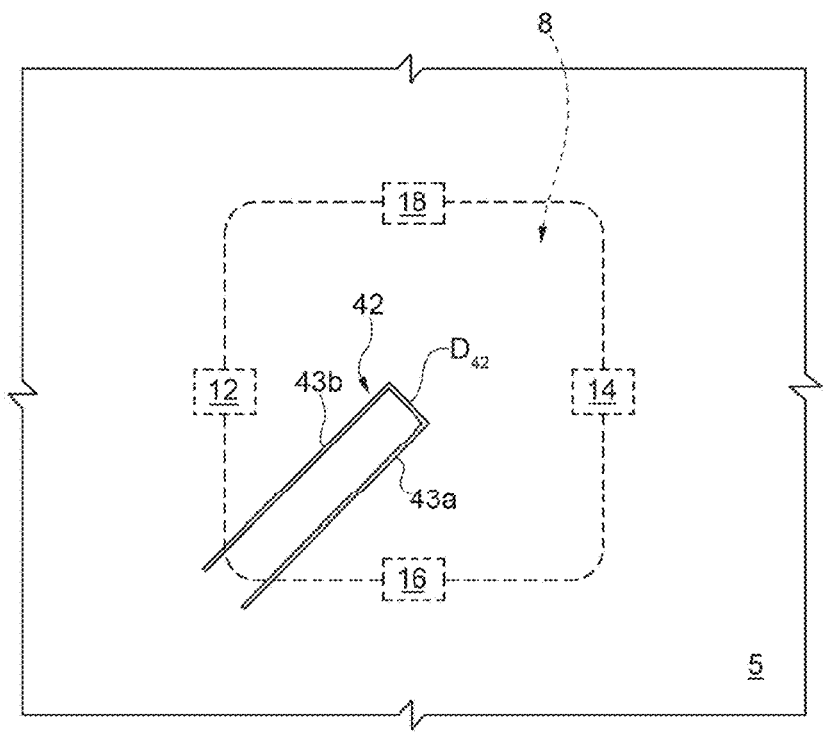
FIGS. 4 and 5 are schematic top plan views with portions removed of two different embodiments of the present sensing structure.

Without this implying any loss of generality, the sensing structure 2 further comprises a first piezoresistive element 12, a second piezoresistive element 14, a third piezoresistive element 16, and a fourth piezoresistive element 18, even though only the first and second piezoresistive elements 12, 14 are illustrated in FIG. 1 (the third and fourth piezoresistive elements 16, 18 are visible, for example, in the embodiment illustrated in FIG. 4).

Each one of the first, second, third, and fourth piezoresistive elements 12-18 is formed, for example, by a corresponding region of the semiconductor body 4, appropriately doped, even though in any case possible are embodiments in which the first, second, third, and fourth piezoresistive elements 12-18 are formed by non-semiconductor materials and thus do not form the semiconductor body 4.

In greater detail, each one of the first, second, third, and fourth piezoresistive elements 12-18 face the top body surface $S_a$, in contact with the top region 5. Furthermore, each one of the first, second, third, and fourth piezoresistive elements 12-18 is such that, in the presence of any deformation of the corresponding crystal lattice, caused by deformations of the membrane 10, there occurs a local variation of resistivity.

More in particular, the first, second, third, and fourth piezoresistive elements 12-18 form a transduction circuitry 20 (the corresponding electrical connections are not shown) of a type in itself known, which is designed to generate an electrical transduction signal (in the case in point, without any loss of generality, a voltage signal) indicating the pressure present on the membrane 10. The transduction circuitry 20 may be biased through corresponding nodes; in these conditions, the transduction circuitry 20 generates precisely the aforementioned electrical transduction signal.

The sensing structure 2 further comprises a plurality of pads of conductive material of a known type, referred to herein as "interface pads". In FIG. 1, for simplicity, only a first interface pad 22 and a second interface pad 24 are illustrated. The considerations provided in what follows with reference to the first and second interface pads 22, 24 may in any case be extended, in a per se known manner, also to one or more of the other interface pads (not shown).

The first and second interface pads 22, 24 extend within the top region 5 and face the top region surface $S_t$, on the outside of the cap 6. Furthermore, the first and second interface pads 22, 24 contact the transduction circuitry 20 by metallizations (not shown), which extend through the top region 5. In this way, either the first interface pad 22 or the second interface pad 24 or both of them make available the electrical transduction signal to the outside world.

As regards the cap 6, it overlies the top region 5, with which it is in direct contact.

In detail, the cap 6 delimits, together with the top region 5, a further cavity 30, referred to hereinafter as "access cavity" 30.

In greater detail, the cap 6 is, for example, of a semiconductor material and has a hole 32, which enables the air to penetrate within the access cavity 30; hereinafter the hole 32 will be referred to as "main hole" 32. Furthermore, the membrane 10 and the top region 5 extend between the access cavity 30 and the sensing cavity 8.

The sensing structure 2 further comprises a test structure, which includes a cantilever element 40, which has a first end, a second end, and a third end, referred to herein respectively as "first proximal end" and "second proximal end" and "distal end". As illustrated hereinafter, the first and second proximal ends are constrained to the top region surface $S_t$, whereas the distal end is floating.

The cantilever element 40 comprises a first portion and a second portion, referred to herein as "first deformable portion" 42 and "second deformable portion" 44, which are fixed together and form corresponding cantilever elements.

Figure 2:
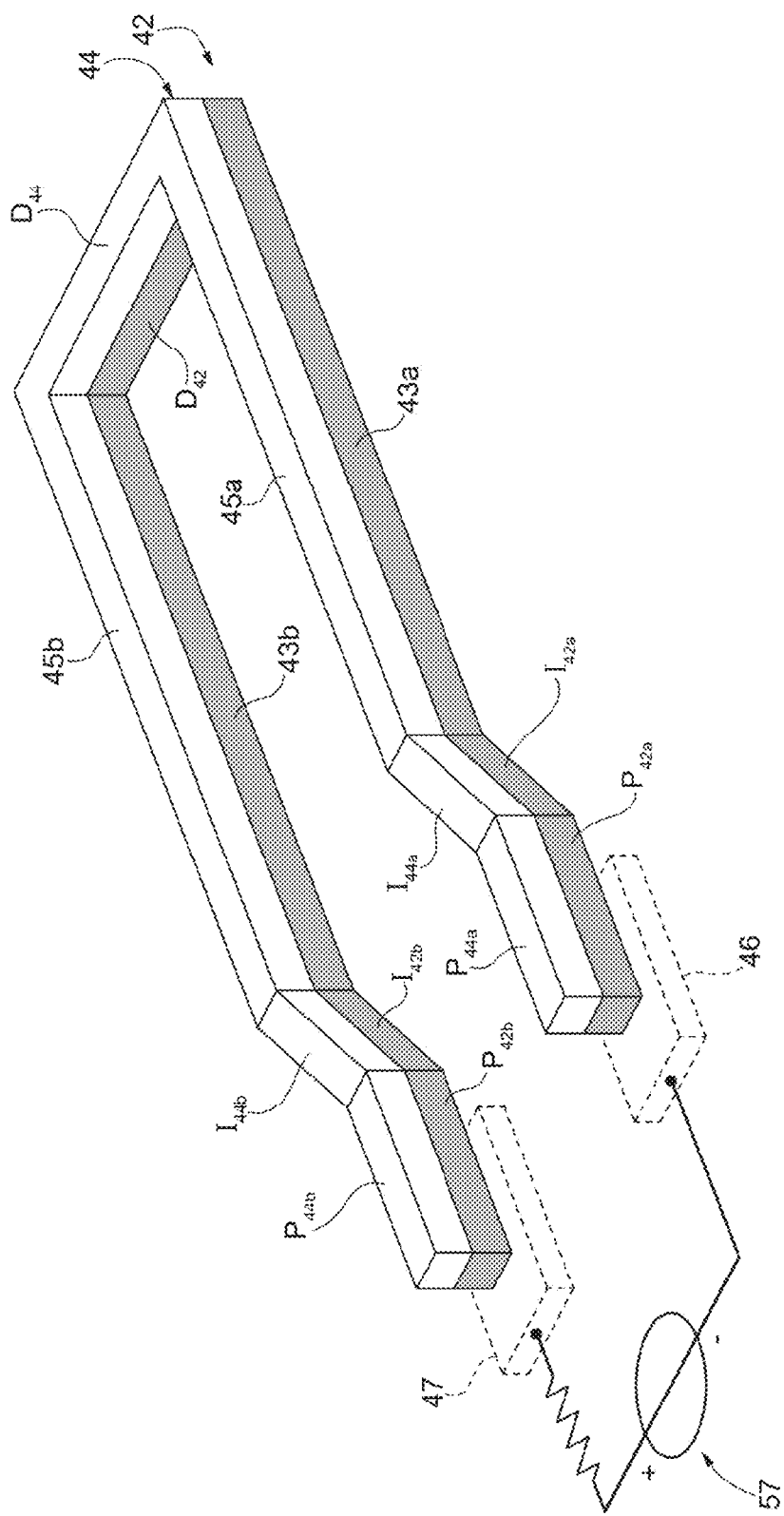
FIG. 2 is a schematic perspective view of a portion of the embodiment illustrated in FIG. 1, together with an equivalent electrical circuit of an external electronic device.

Without this implying any loss of generality, the first and second deformable portions 42, 44 have, in top plan view, a same shape, in the case in point they are U-shaped, as illustrated in FIG. 2.

The first deformable portion 42 has a first proximal end $P_{42a}$ and a second proximal end $P_{42b}$, which are constrained to the top region surface $S_t$ and form the first and second proximal ends, respectively, of the cantilever element 40; further, the first deformable portion 42 has a respective distal region $D_{42}$, which is free and forms the distal end of the cantilever element 40.

In resting conditions, the distal region $D_{42}$ of the first deformable portion 42 is arranged at a greater height (calculated, for example, with respect to the top region surface $S_t$) than the first and second proximal ends $P_{42a}$, $P_{42b}$. Thus, the first deformable portion 42 has a non-planar profile, which extends on a number of levels in height. Furthermore, the distal region $D_{42}$ of the first deformable portion 42 is connected to the first and second proximal ends $P_{42a}$, $P_{42b}$ of the first deformable portion 42 through, respectively, a first inclined region $I_{42a}$ and a first parallel region 43a, and a second inclined region $I_{42b}$ and a second parallel region 43b.

In greater detail, in resting conditions, the first and second parallel regions 43a, 43b have elongated shapes and extend parallel to the top region surface $S_t$. The distal region $D_{42}$ of the first deformable portion 42 has an elongated shape and is connected to the first and second parallel regions 43a, 43b. Further, the distal region $D_{42}$ extends perpendicular to the first and second parallel regions 43a, 43b, with which, in resting conditions, it is coplanar.

The first inclined region $I_{42a}$ has an elongated shape and is inclined, in resting conditions, with respect to the top region surface $S_t$. Furthermore, the first inclined region $I_{42a}$ connects the first parallel region 43a to the first proximal end $P_{42a}$ of the first deformable portion 42.

The second inclined region $I_{42b}$ has an elongated shape and is inclined, in resting conditions, with respect to the top region surface $S_t$. Furthermore, the second inclined region $I_{42b}$ connects the second parallel region 43b to the second proximal end $P_{42b}$ of the first deformable portion 42.

The second deformable portion 44 has a respective first proximal end $P_{44a}$ and a respective second proximal end $P_{44b}$, which are fixed, respectively, to the first and second proximal ends $P_{42a}$, $P_{42b}$ of the first deformable portion 42, on top of, and in direct contact with, which they are arranged. Furthermore, the first and second proximal ends $P_{44a}$, $P_{44b}$ of the second deformable portion 44 form the first and second proximal ends, respectively, of the cantilever element 40.

The second deformable portion 44 further comprises a respective distal region $D_{44}$, which is arranged on top of, and in direct contact with, the distal region $D_{42}$ of the first deformable portion 42 for forming the distal end of the cantilever element 40.

In resting conditions, the distal region $D_{44}$ of the second deformable portion 44 is at a greater height than the first and second proximal ends $P_{44a}$, $P_{44b}$ of the second deformable portion 44, which thus has a non-planar profile. Furthermore, the distal region $D_{44}$ of the first deformable portion 44 is connected to the first and second proximal ends $P_{44a}$, $P_{44b}$ of the second deformable portion 44 through, respectively, a third inclined region $I_{44a}$ and a third parallel region 45a, and a fourth inclined region $I_{44b}$ and a fourth parallel region 45b.

In greater detail, in resting conditions, the third and fourth parallel regions 45a, 45b have elongated shapes, extend parallel to the top region surface $S_t$ and are respectively arranged on top of the first and second parallel regions 43a, 43b, with which they are in direct contact. The distal region $D_{44}$ of the second deformable portion 44 has an elongated shape and is connected to the third and fourth parallel regions 45a, 45b. Further, the distal region $D_{44}$ extends perpendicular to the third and fourth parallel regions 45a, 45b, with which, in resting conditions, it is coplanar.

The third inclined region $I_{44a}$ has an elongated shape and is inclined, in resting conditions, with respect to the top region surface $S_t$. Furthermore, the third inclined region $I_{44a}$ is arranged on top of the first inclined region $I_{42b}$, with which it is in direct contact, and connects the third parallel region 45a to the first proximal end $P_{44a}$ of the second deformable portion 44.

The fourth inclined region $I_{44b}$ has an elongated shape and is inclined, in resting conditions, with respect to the top region surface $S_t$. Furthermore, the fourth inclined region $I_{44b}$ is arranged on top of the second inclined region $I_{42b}$, with which it is in direct contact, and connects the fourth parallel region 45b to the second proximal end $P_{44b}$ of the second deformable portion 44.

In greater detail, in resting conditions, the first and second proximal ends $P_{42a}$, $P_{42b}$ of the first deformable portion 42 are at a first height, whereas the first and second proximal ends $P_{44a}$, $P_{44b}$ of the second deformable portion 44 are at a second height, greater than the first height. In addition, the distal region $D_{42}$ of the first deformable portion 42 is arranged at a third height, greater than the second height, whereas the distal region $D_{44}$ of the second deformable portion 44 is arranged at a fourth height, greater than the third height.

In practice, the first deformable portion 42 is arranged between the second deformable portion 44 and the top region 5. Furthermore, the first deformable portion 42 extends so that, in resting conditions, it overlies, at a distance, at least part of the membrane 10. Consequently, in resting conditions, also the second deformable portion 44 overlies, at a distance, at least part of the membrane 10. In particular, the membrane 10 is overlaid by the distal region $D_{42}$ of the first deformable portion 42 and by the distal region $D_{44}$ of the second deformable portion 44.

The sensing structure 2 further comprises a further pair of pads of conductive material, referred to herein as "first structure pad" 46 and "second structure pad" 47 (the latter being illustrated in FIG. 2). Each of the first and second structure pads 46, 47 extends within the top region 5 and faces the top region surface $S_t$, and in particular the access cavity 30.

Given this, the first and second proximal ends $P_{42a}$, $P_{42b}$ of the first deformable portion 42 contact, respectively, the first and second structure pads 46, 47, and are thus fixed with respect to the top region 5 and the semiconductor body 4.

The sensing structure 2 further comprises, without this implying any loss of generality, a further pair of pads, referred to hereinafter "first and second test pads" 48, 50.

Each of the first and second test pads 48, 50 extends within the top region 5 and surfaces on the top region surface $S_t$, on the outside of the cap 6. Furthermore, the first and second test pads 48, 50 are connected, respectively, to the first and second structure pads 46, 47 by metallizations (not shown) that extend in the top region 5. Each of the first and second test pads 48, 50 is thus electrically connected to a corresponding end of the first and second proximal ends $P_{42a}$, $P_{42b}$ of the first deformable portion 42. For practical purposes, the first and second test pads 48, 50 may be contacted by a first probe 52 and a second probe 54, which form an excitation device 57, an equivalent electrical circuit of which is illustrated in FIG. 2.

Once again with reference to the first and second deformable portions 42, 44, they are, respectively, of a first material and a second material, which have coefficients of thermal expansion that are different from one another. In particular, the first and second materials have coefficients of thermal expansion such that, as the temperature of the cantilever element 40 increases, the latter bends towards the membrane 10.

In greater detail, the cantilever element 40 bends so that the distal end $D_{42}$ of the first deformable portion 42 contacts a portion of top region surface $S_t$ arranged above the membrane 10 and the sensing cavity 8.

In greater detail, the second material may be chosen so that has a linear coefficient of thermal expansion a at least 10% higher than the linear coefficient of thermal expansion of the first material.

In addition, the first material is conductive so that within the first deformable portion 42 there may circulate a test current, which is applied through the first and second probes 52, 54 and causes an increase in temperature of the cantilever element 40 and a consequent deformation thereof.

Figure 3:
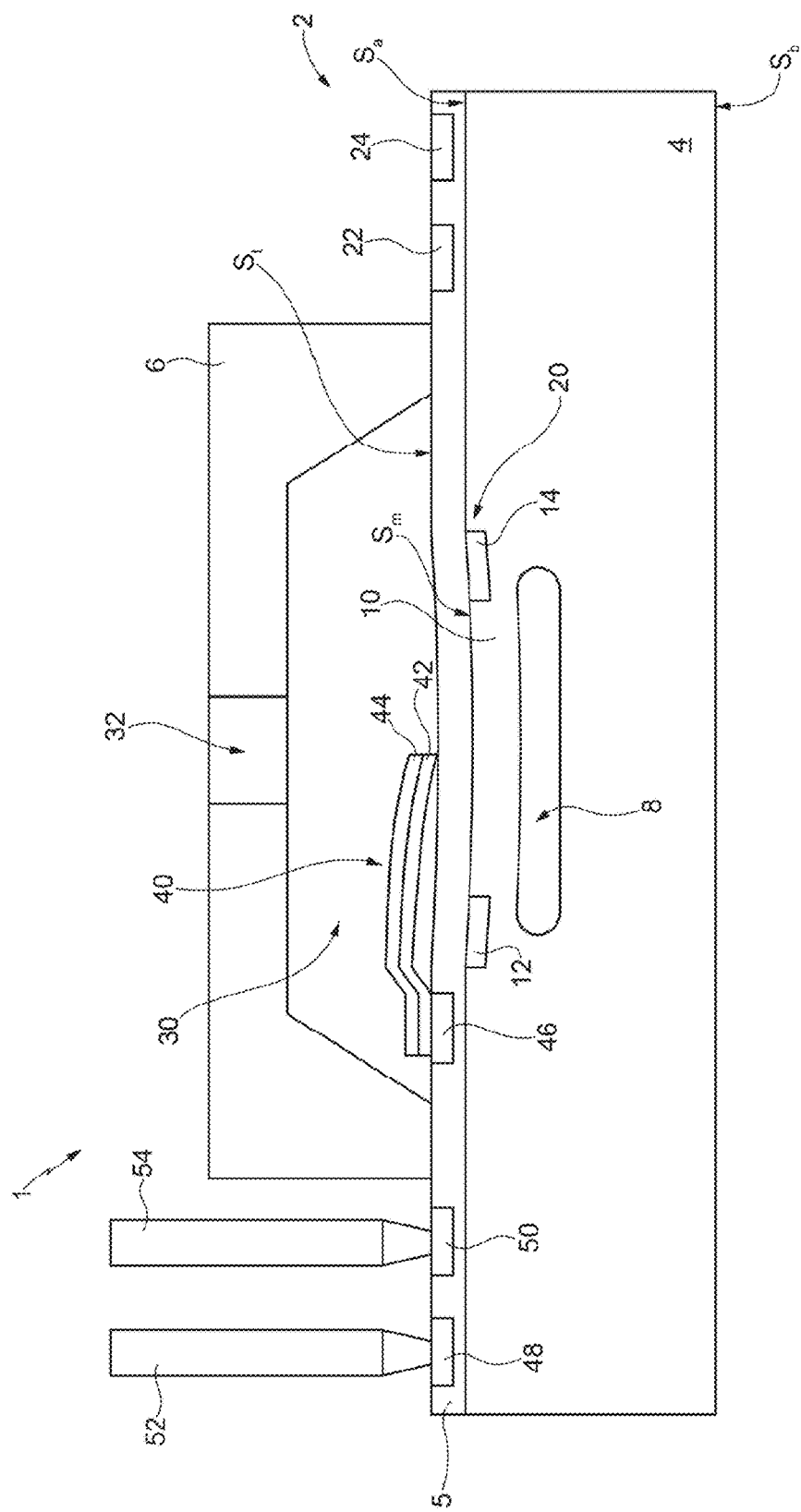

As has been mentioned previously, by increasing the temperature of the cantilever element 40, it is possible to cause the distal region $D_{42}$ of the first deformable portion 42, which in resting conditions is arranged at a distance from the top region 5, to contact the top region 5 and exert a (known) pressure on the membrane 10, as illustrated in FIG. 3. This pressure may be used for testing the sensing structure 2, for example by verifying that the corresponding electrical transduction signal assumes an expected value. The pressure exerted on the membrane 10 is thus a function of the test current.

In greater detail, the test current may be applied by the excitation device 57, through the first and second probes 52, 54, which may form part of a same automatic test device, for example of a known type.

As regards the second material, which, as has been said, forms the second deformable portion 44, also this may be conductive, or else may be an insulating material such as for example an oxide, a ceramic material, a polymer, or a resin.

Further possible are embodiments (not shown) in which the first and second test pads 52, 54 contact, respectively, the first and second proximal ends $P_{44a}$, $P_{44b}$ of the second deformable portion 44, in which case the second material is a conductive material, whereas the first material may also be a conductive material, or else an insulating material.

In general, at least one of the first and second materials is electrically conductive. Furthermore, it is possible for both the first and second materials to be metal, so that they will be good electrical and thermal conductors.

In the case where any of the first and second materials is metal, it may be chosen, for example, from among: copper, aluminum, tungsten, rhodium, palladium, cobalt, iron, gold, beryllium, titanium, molybdenum, zinc, nickel, silver, manganese, or a corresponding alloy. Once again purely by way of example, also possible are embodiments in which the first and second materials form one of the following pairs: tungsten-aluminum, tungsten-copper, copper-aluminum, iron-aluminum, tungsten-zinc, titanium-manganese, tantalum-manganese, titanium-aluminum, or nickel-zinc.

Further possible are embodiments in which the first material or the second material is semiconductor material, such as for example silicon, possibly doped.

Figure 5:
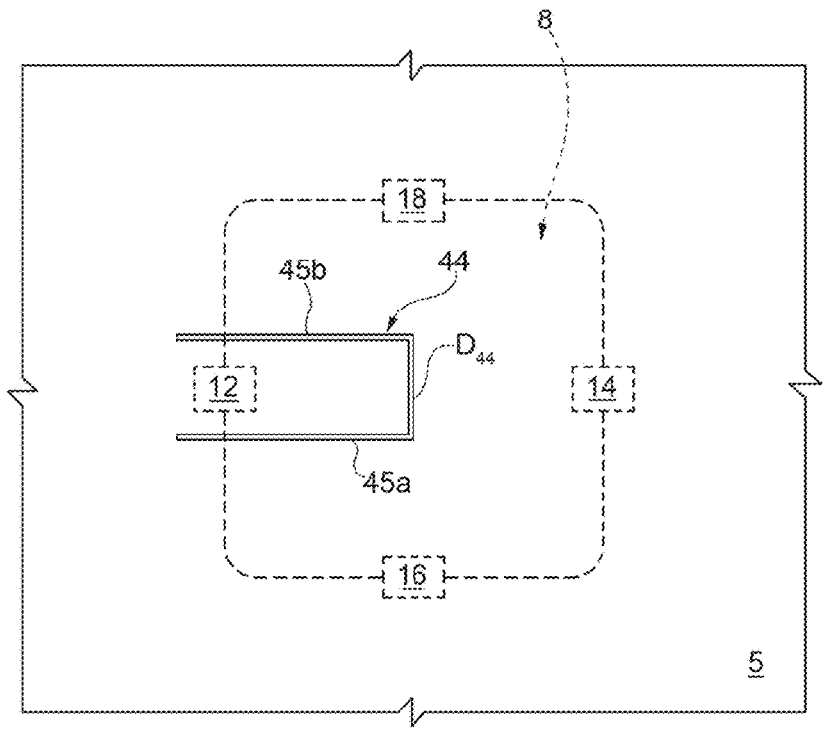

Purely by way of example, FIGS. 4 and 5 show two different embodiments, which exemplify possible arrangements of the cantilever element 40 with respect to the first, second, third, and fourth piezoresistive elements 12-18. In both cases, it is once again assumed that the second deformable portion 44 has a same shape, in top plan view, as the first deformable portion 42, on top of which it is arranged. Furthermore, for simplicity of representation, in FIG. 4 the second deformable portion 44 is not illustrated, and the first deformable portion 42 is illustrated only in part; likewise, in FIG. 5, the second deformable portion 44 is illustrated only in part. Once again for simplicity of representation, in FIGS. 4 and 5 no pad is illustrated.

In detail, in the embodiment illustrated in FIG. 4, the sensing cavity 8 has, in top plan view, the shape of a square with rounded vertices. Further, the first and second parallel regions 43a, 43b extend parallel to a diagonal of the aforementioned rounded square. In particular, the first and second parallel regions 43a, 43b are arranged so that one rounded vertex is arranged, in top plan view, between them.

In greater detail, in the embodiment illustrated in FIG. 4, each of the first, second, third, and fourth piezoresistive elements 12, 14, 16, 18 extends, in top plan view, substantially half way along a corresponding side of the aforementioned rounded square and thus overlies a portion of this corresponding side, this portion including the point of this side arranged approximately half way along the side itself. Without any loss of generality, the midpoint of each side may be determined by excluding the rounded corners of the aforementioned rounded square and thus by considering just the rectilinear portion of the side.

In practice, each of the first, second, third, and fourth piezoresistive elements 12-18 is arranged in a corresponding vertex of an imaginary square rotated by 45° with respect to the aforementioned rounded square. Furthermore, each of the first, second, third, and fourth piezoresistive elements 12-18 overlies a corresponding portion of the edge of the sensing cavity 8. Consequently, in top plan view, the first, second, third, and fourth piezoresistive elements 12-18 are arranged around a center of symmetry.

Given this, the cantilever element 40 is such that the distal region $D_{42}$ of the first deformable portion 42 contacts a point of the top region 5 that substantially coincides, in top plan view, with the aforementioned center of symmetry. In this way, the mechanical stress is evenly distributed between the first, second, third, and fourth piezoresistive elements 12-18; further, the cantilever element 40 is, in particular, arranged at a distance from the piezoresistive elements 12-18, with the consequent advantage of not altering appreciably the local mechanical stress near the piezoresistive elements 12-18.

In the embodiment illustrated in FIG. 5, the third and fourth parallel regions 45a, 45b extend, in resting conditions, parallel to a pair of sides of the aforementioned rounded square. In particular, without any loss of generality, the third and fourth parallel regions 45a, 45b are arranged so that the first piezoresistive element 12 is arranged, in top plan view, between them. In addition, the distal region $D_{44}$ of the second deformable portion 44 passes, in top plan view, over the center of the aforementioned rounded square.

In other embodiments (not shown), the cantilever element may have, in top plan view, a shape with rounded corners, or in any case with smoothed corners, or else a V-shape.

Figure 6:
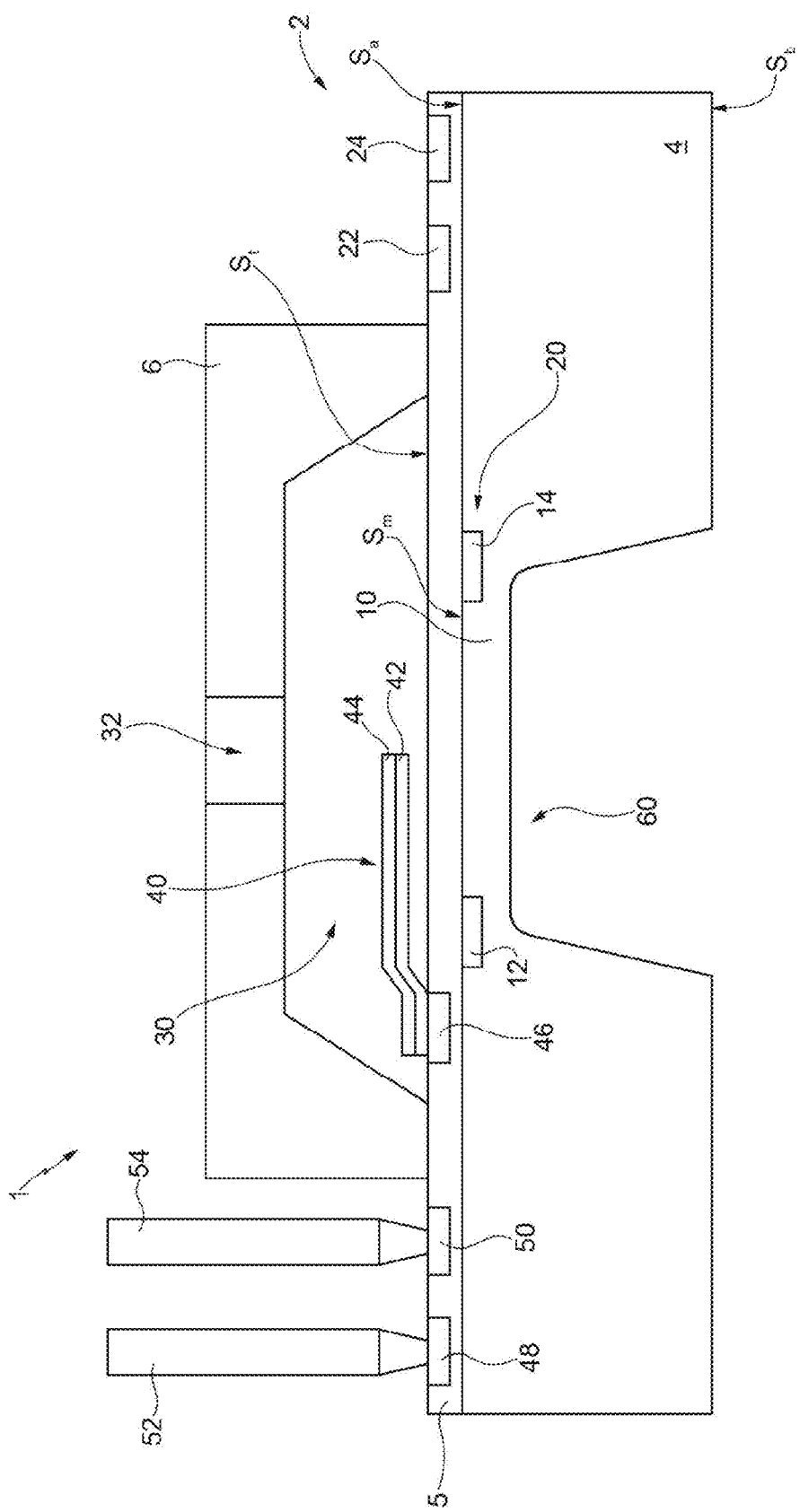
FIGS. 6-10 are schematic cross-sections of further embodiments of the present sensing structure.

In general, as illustrated in FIG. 6, further possible are embodiments in which the sensing cavity, here designated by 60, is not of a buried type, but rather is open at the bottom for giving out onto the bottom body surface $S_b$.

Figure 7:
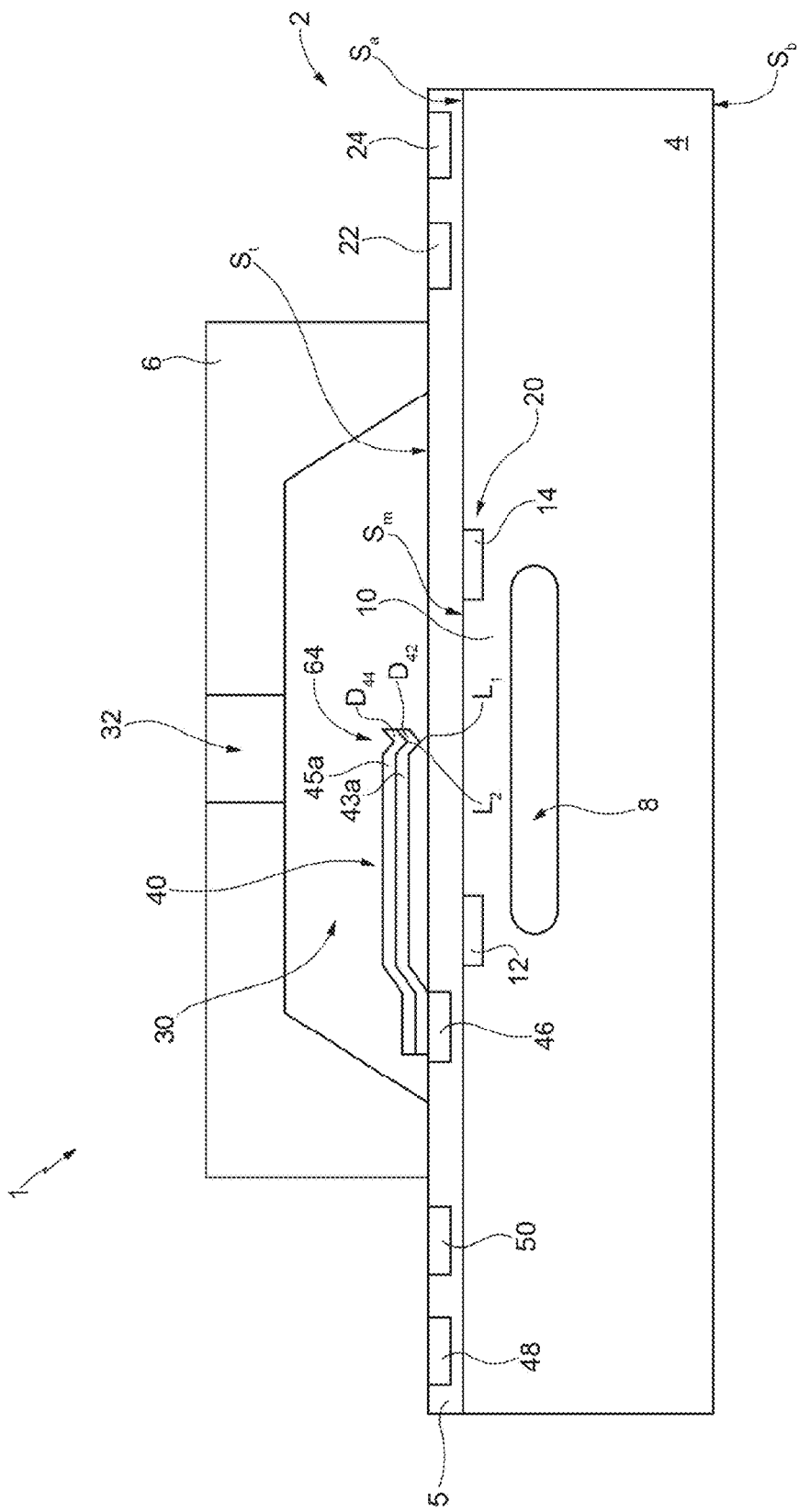

According to a different embodiment, illustrated in FIG. 7, each one of the distal region $D_{42}$ of the first deformable portion 42 and the distal region $D_{44}$ of the second deformable portion 44 is, in cross-section, V-shaped. Consequently, the distal region $D_{42}$ of the first deformable portion 42 and the distal region $D_{44}$ of the second deformable portion 44 form an apex portion 64 of the cantilever element 40, which has an elongated shape and is connected, at a first end, to the first and third parallel regions 43a, 45a and, at a second end, to the second and fourth parallel regions 43b, 45b.

In greater detail, each one of the distal region $D_{42}$ of the first deformable portion 42 and the distal region $D_{44}$ of the second deformable portion 44 is formed by a pair of elongated regions arranged, without any loss of generality, at 90° and in contact with one another. Furthermore, the distal region $D_{42}$ of the first deformable portion 42 and the distal region $D_{44}$ of the second deformable portion 44 define, respectively, a first vertex line $L_1$ and a second vertex line $L_2$.

In resting conditions, the first and second vertex lines $L_1$, $L_2$ are parallel to one another and perpendicular to the first, second, third, and fourth parallel regions 43a, 43b, 45a, 45b. Furthermore, the first vertex line $L_1$ overlies the top region surface $S_t$ at a distance shorter than the distance between the top region surface $S_t$ itself and any of the first and second parallel regions 43a, 43b. Consequently, following upon deformation of the cantilever element 40, the first vertex line $L_1$ bears upon the top region surface $S_t$. As compared to what is illustrated, for example, in FIG. 1, in order to exert a pressure on the membrane 10, a smaller deformation of the cantilever element 40 is thus sufficient.

In a variant (not shown), the apex portion 64 may have a section with a rounded shape.

Figure 8:
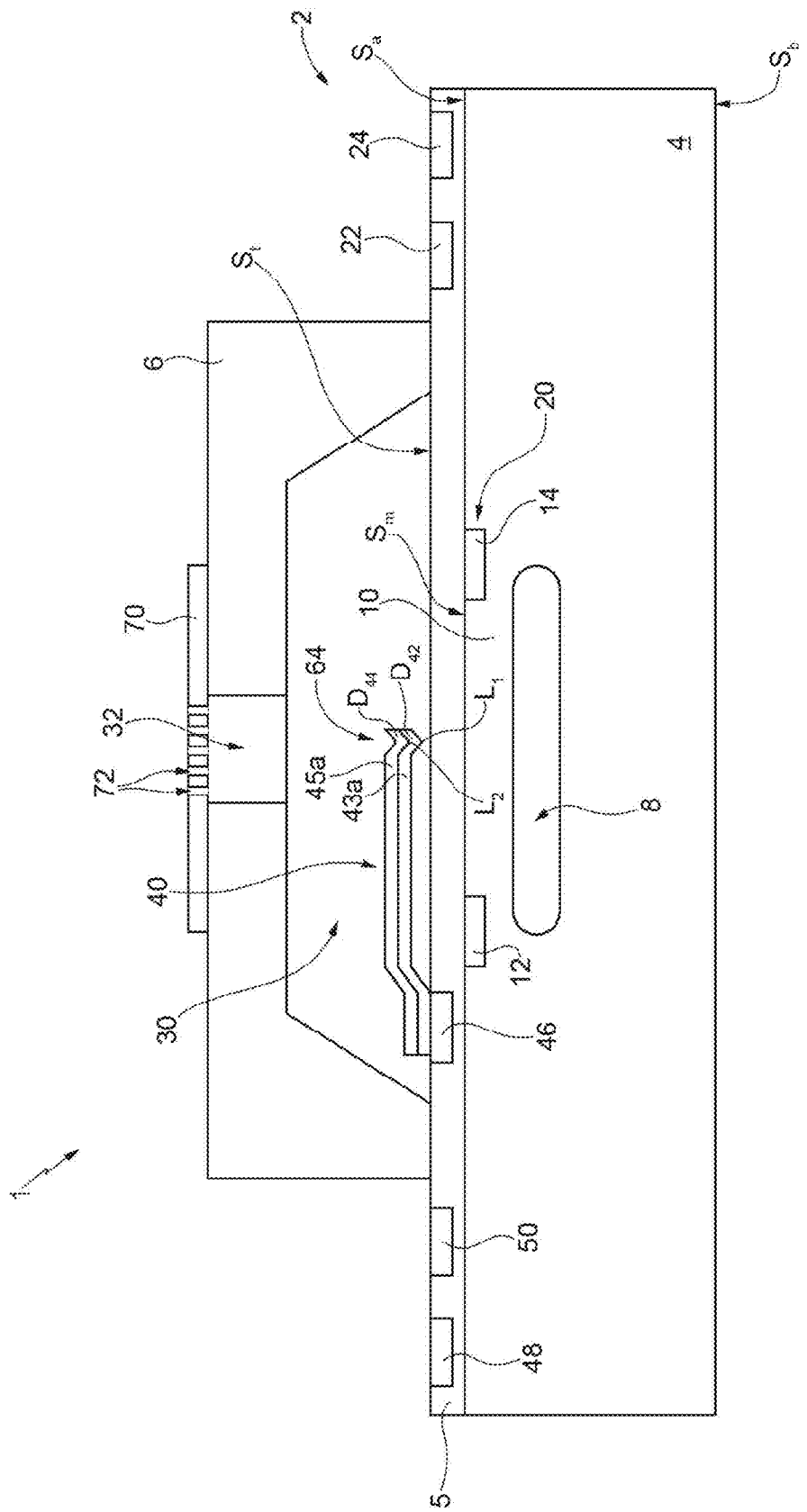

FIG. 8 shows a further possible variant of the sensing structure 2 and regards, without any loss of generality, the case where the cantilever element 40 has the apex portion 64, and the sensing cavity 8 is of a buried type. In this variant, the cap 6 is overlaid, in direct contact, by a perforated diaphragm 70, which is, for example, of polymeric material and has, above the main hole 32, a plurality of secondary holes 72. If we assume, without this implying any loss of generality, that the main hole 32 and the secondary holes 72 have a cylindrical shape, it is possible for the diameter of each secondary hole 72 not to be greater than 10% of the diameter of the main hole 32.

The secondary holes 72 have the function of preventing particles of considerable size from penetrating into the access cavity 30, thus interfering with operation of the cantilever element 40. Furthermore, in general, instead of the perforated diaphragm 70, a semipermeable layer may be present, i.e., one that may be traversed only by air, such as for example an osmotic membrane.

Figure 9:
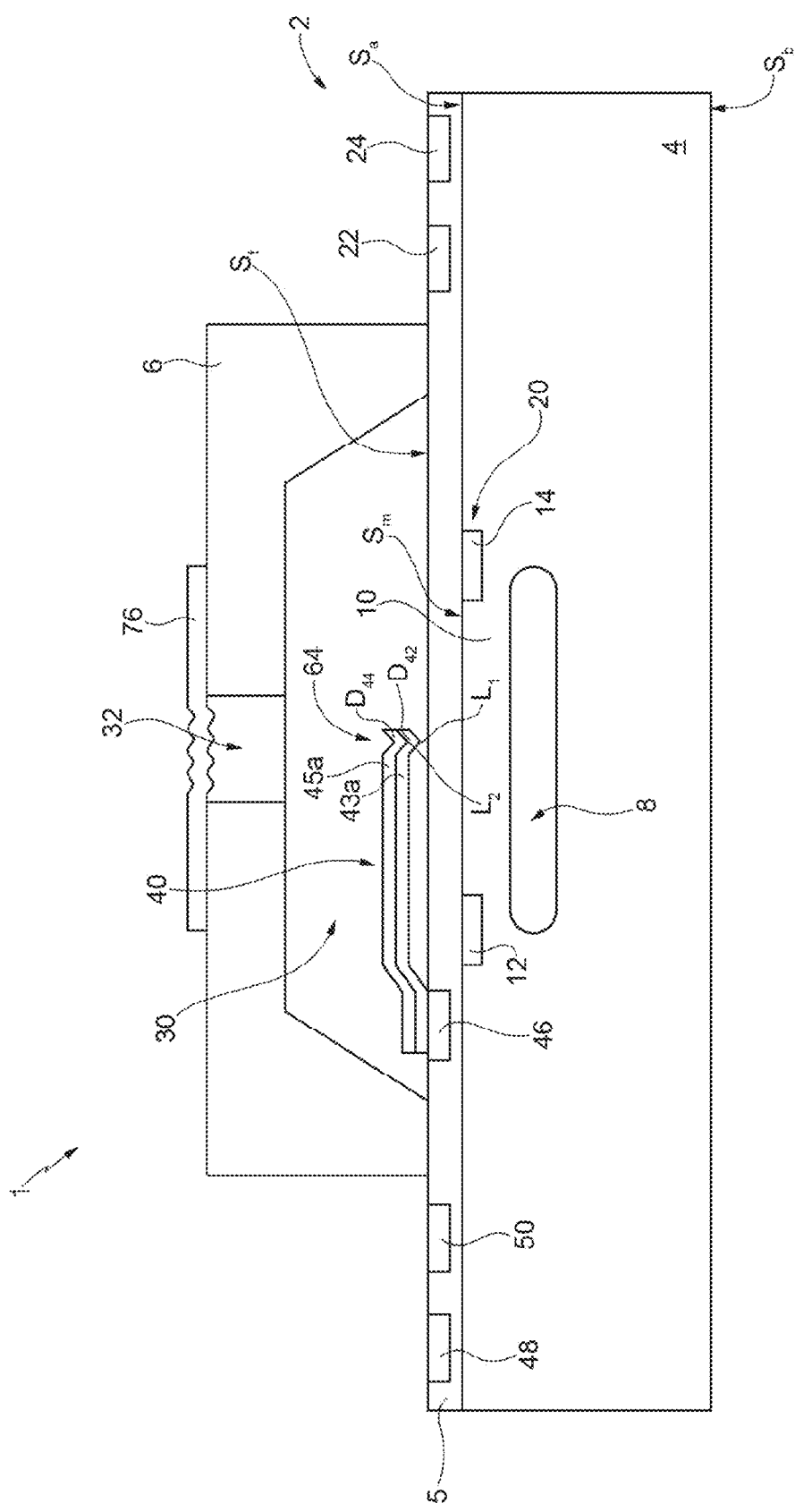

FIG. 9 shows a further possible variant of the sensing structure 2 and once again regards, without this implying any loss of generality, the case where the cantilever element 40 has the apex portion 64, and the sensing cavity 8 is of a buried type. In this variant, the cap 6 is overlaid, in direct contact, by a closing layer 76, which closes the main hole 32 and has a plurality of undulations above the main hole 32. For instance, the closing layer 76 may be of elastic polymeric material and may be obtained with a thermoforming process.

For practical purposes, the closing layer 76 prevents undesirable access of particles into the access cavity 30, but enables transfer into the access cavity 30 of the variations of pressure that are set up outside the sensing structure 2.

Figure 10:
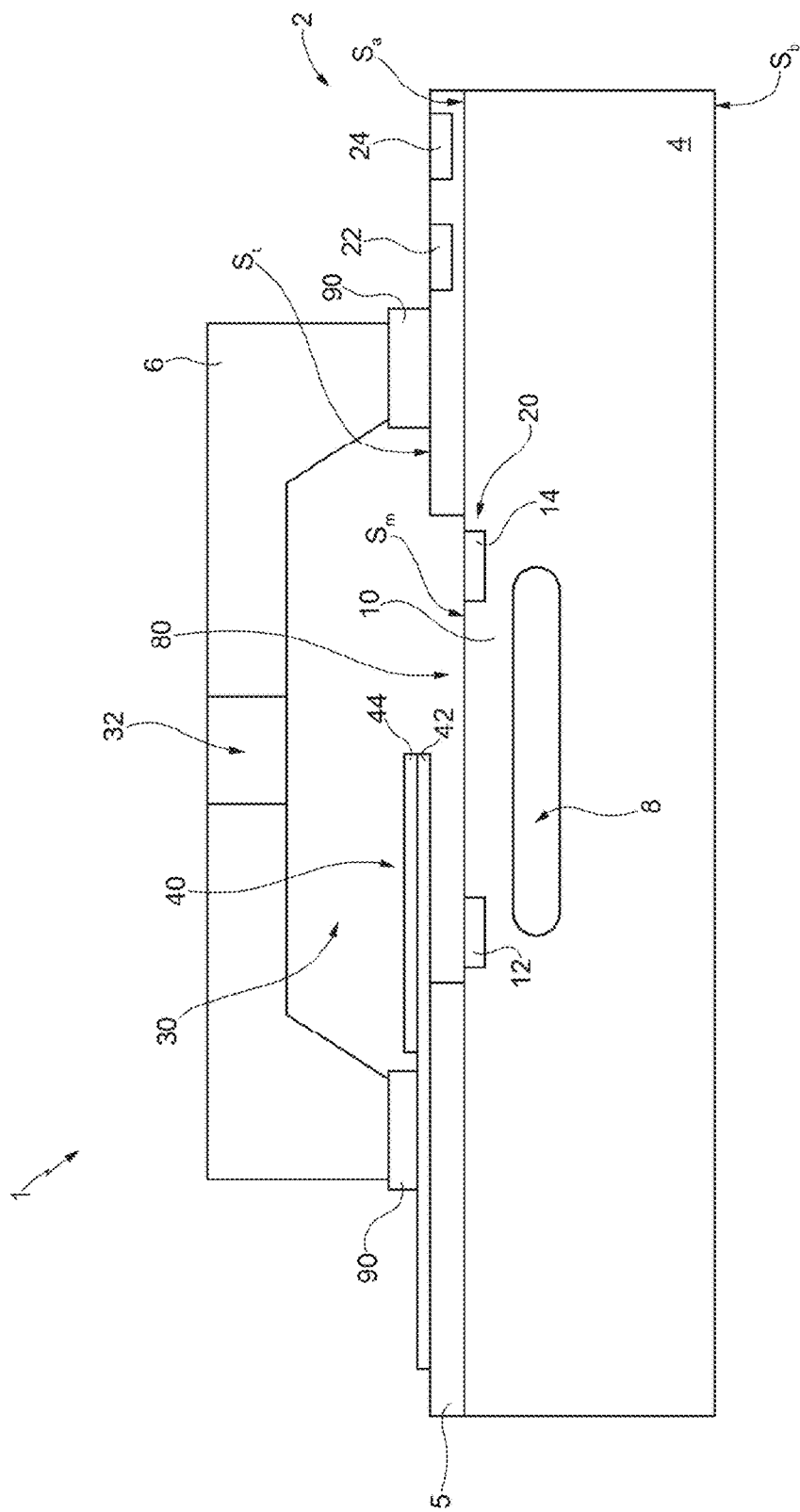

Further possible are embodiments such as the one illustrated in FIG. 10, where, for simplicity of representation and without any loss of generality, it is assumed that the cantilever element 40 is without the apex portion 64, that the sensing cavity 8 is of a buried type, and that the main hole 32 is not overlaid either by the perforated diaphragm 70 or by the closing layer 76.

In detail, the top region 5 has a portion removed for forming a window 80 above the membrane 10. Furthermore, in resting conditions, each one of the first and second deformable portions 42, 44 has a planar shape and extends in part on the top region 5 and in part over the window 80, at a distance from the latter.

In greater detail, the first deformable portion 42 is of conductive material and extends not only into the access cavity 30, but also on the outside of the cap 6. Consequently, the first and second proximal ends $P_{42a}$, $P_{42b}$ of the first deformable portion 42 extend on the outside of the cap 6 and do not contact the first and second structure pads 46, 47, but rather the top region 5. The first and second proximal ends $P_{42a}$, $P_{42b}$ of the first deformable portion 42 may be contacted directly by the first and second probes 52, 54 for causing the test current to flow in the first deformable portion 42. In this way, the first and second structure pads 46, 47, as also the first and second test pads 48, 50 and the corresponding connection metallizations, may be absent. The first, second, third, and fourth piezoresistive elements 12-18 may be protected from any external contamination, for example, via an oxide layer (not shown).

Figure 11:
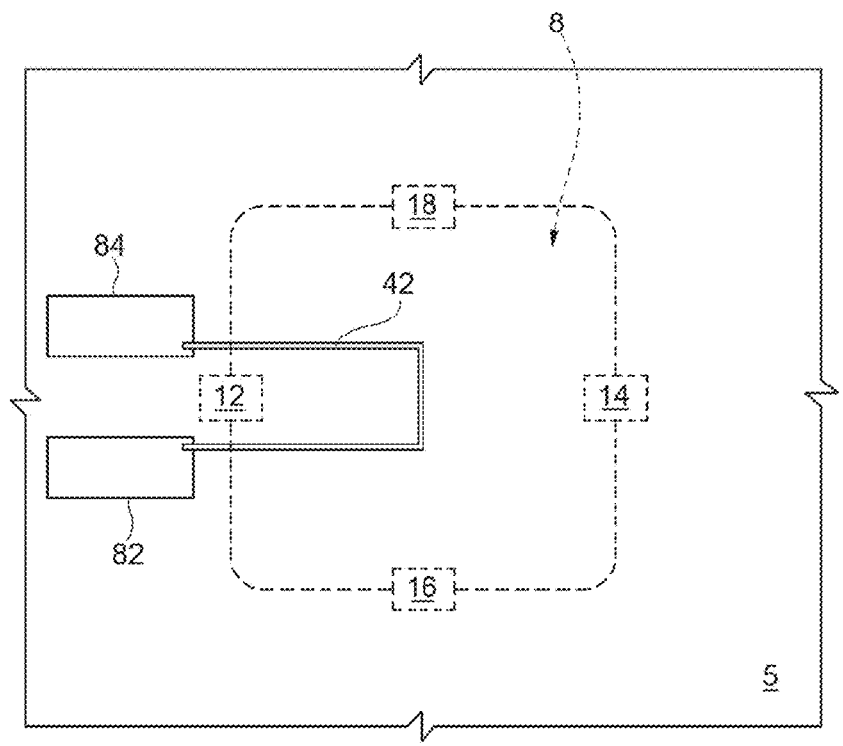
FIG. 11 is a schematic top plan view with portions removed of a variant of the embodiment illustrated in FIG. 10.

It is, however, possible that, as illustrated in FIG. 11, the sensing structure 2 presents a first auxiliary pad 82 and a second auxiliary pad 84 of conductive material, which extend into the top region 5 starting from the top region surface $S_t$, which is faced by them. The first and second auxiliary pads 82, 84 are in direct contact, respectively, with the first and second proximal ends $P_{42a}$, $P_{42b}$ of the first deformable portion 42. Furthermore, the first and second auxiliary pads 82, 84 have surfaces with areas greater than the areas of the first and second proximal ends $P_{42a}$, $P_{42b}$ of the first deformable portion 42. Consequently, they may be contacted with greater ease by the first and second probes 52, 54.

Once again with reference to FIG. 10, the cap 6, instead of resting directly on the top region 5, is constrained to the latter by interposition of a coupling region 90 of insulating material such as for example glass-frit. The coupling region 90 then contacts, in addition to the cap 6, a part of the top region 5 and a part of the first deformable portion 42.

For practical purposes, in order to deform the cantilever element 40 so that it exerts a given pressure on the membrane 10, it is possible to induce an increase in temperature of the cantilever element 40 without resorting to the test current. In fact, as illustrated in FIG. 12, it is possible to arrange the sensing structure 2 on a thermal chuck 85, i.e., a support of thermally conductive material equipped with a heating element (not shown).

Figure 12:
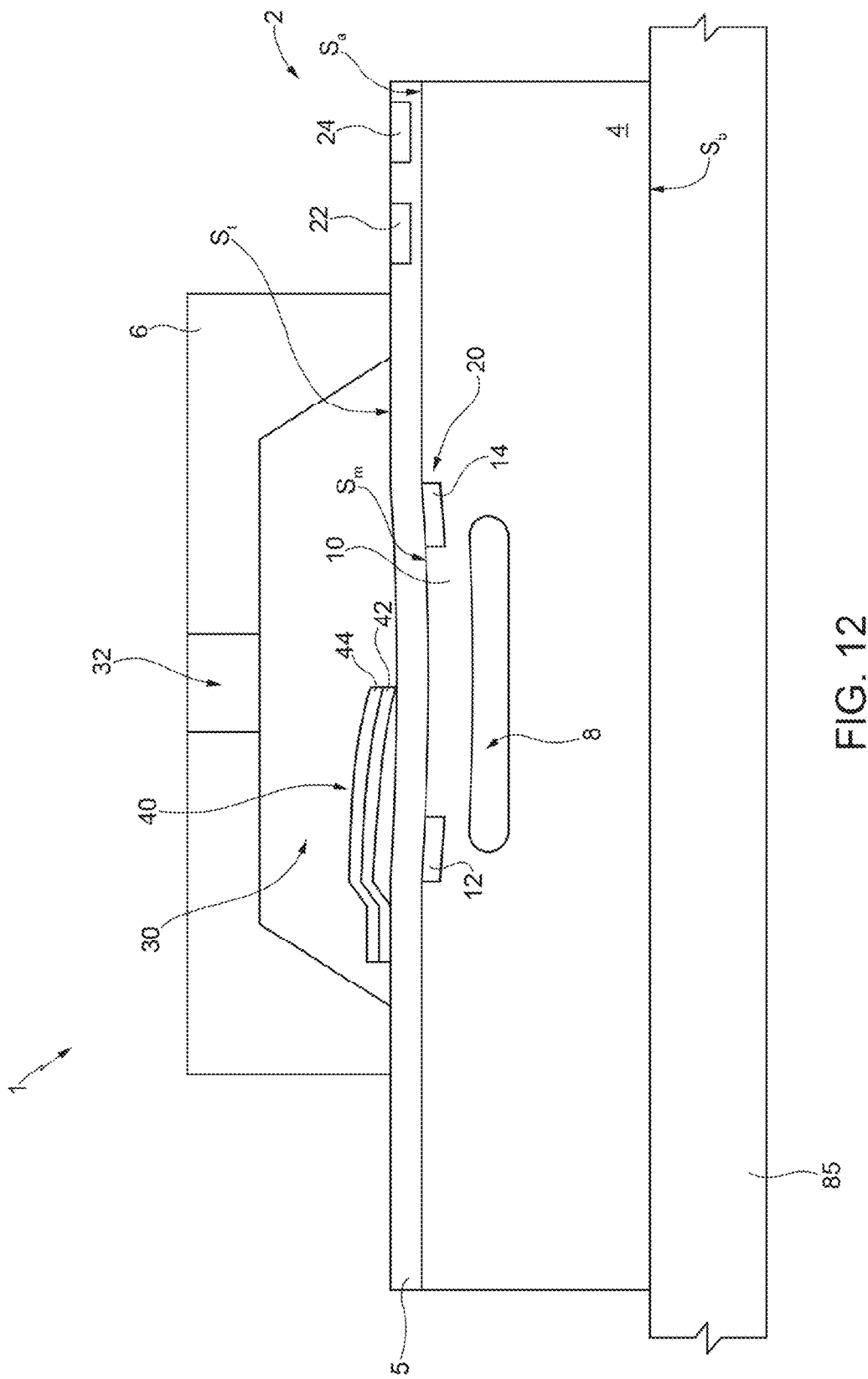
FIGS. 12, 14, 15, 17, 18 and 19 are schematic cross-sections of further embodiments of the present sensing structure.

In particular, in the case where the increase in temperature of the cantilever element 40 is induced by the thermal chuck 85, it is possible to adopt the embodiment illustrated precisely in FIG. 12, where both the first and second materials may be electrically insulating. In this embodiment, the first and second test pads 48, 50 and the first and second structure pads 46, 47 may be absent.

In practice, in the case where the embodiment illustrated in FIG. 12 is adopted, a thermal stimulus is generated, which causes application of a predetermined pressure on the membrane 10. On the basis of the corresponding electrical transduction signal, it is thus possible to verify proper operation of the sensing structure 2.

Figure 13:
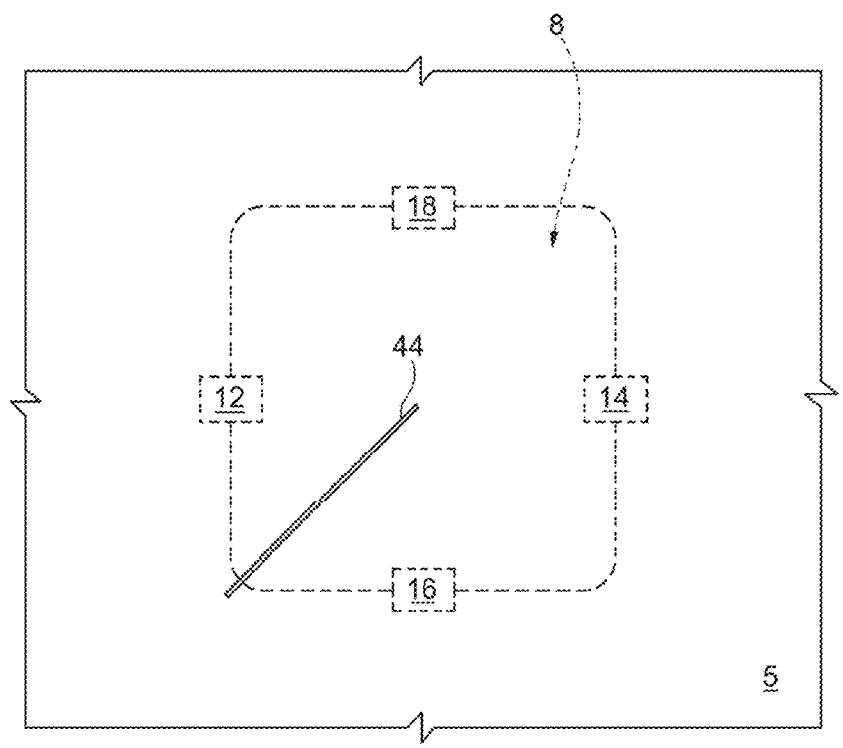
FIGS. 13, 16, 20 and 21 are schematic top plan views with portions removed of embodiments of the present sensing structure.

As illustrated in FIG. 13, since the test current may not be generated, the first and second deformable portions 42, 44, and thus the cantilever element 40, may each have an elongated shape having just one end fixed to the semiconductor body 4, instead of two. In particular, in the embodiment illustrated in FIG. 13, the cantilever element 40 extends, in top plan view, along a diagonal of the aforementioned rounded square, until it overlies the center of the rounded square.

Figure 14:
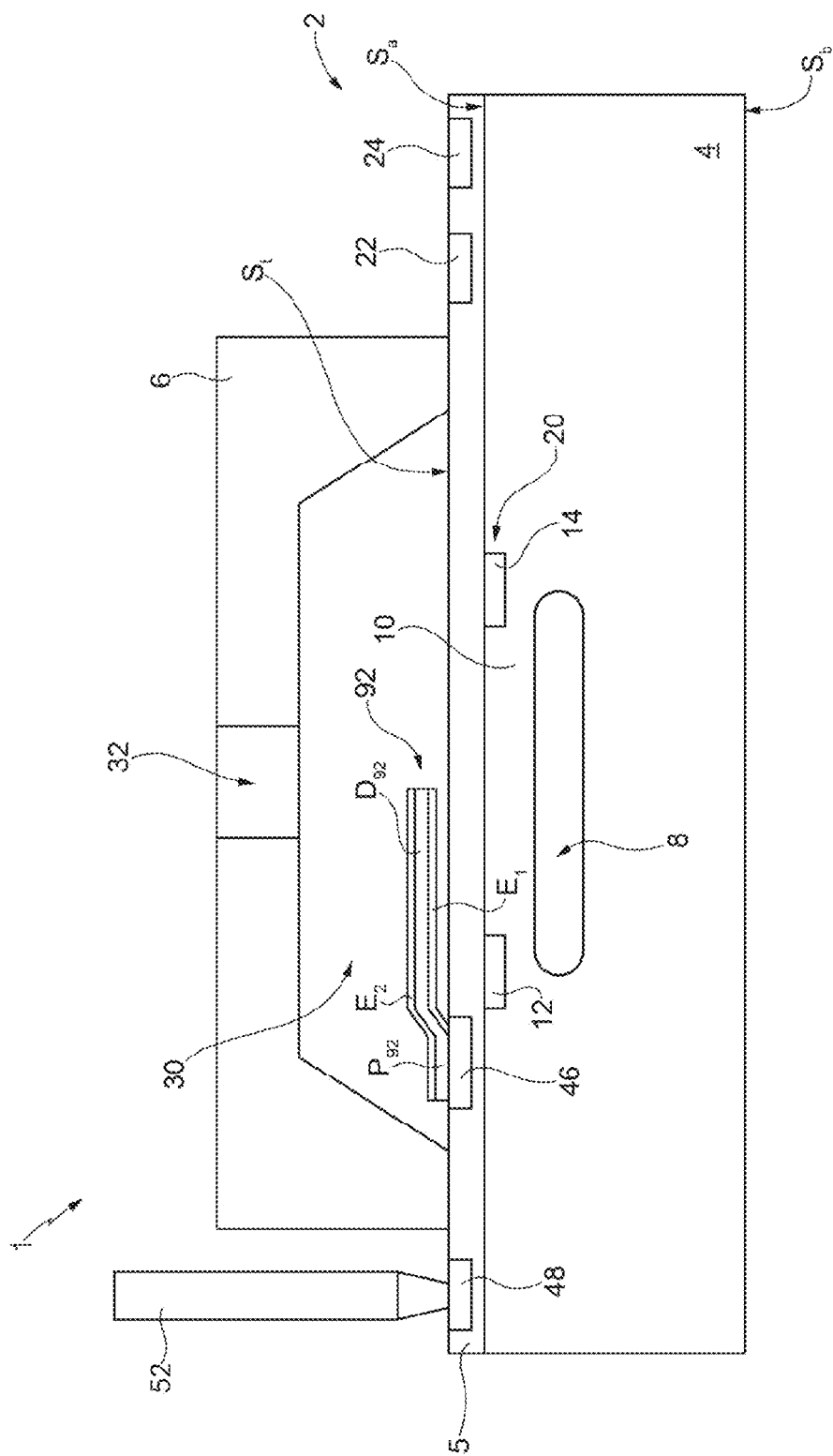

According to a different embodiment (illustrated in FIG. 14), the cantilever element is formed by the first deformable portion, here designated by 92, which is of a piezoelectric material; in this case, the second deformable portion 44 may be absent.

In detail, in top plan view, the first deformable portion 92 has an elongated shape, of the type illustrated in FIG. 13. The first deformable portion 92 thus extends along a diagonal of the aforementioned rounded square. Furthermore, the first deformable portion 92 has a non-planar shape; consequently, the first deformable portion 92 comprises the first proximal portion, here designated by $P_{92}$, and the distal region, here designated by $D_{92}$. The first proximal portion $P_{92}$ is fixed to the top body surface $S_a$, whereas the distal region $D_{92}$ overlies the membrane 10 at a distance in resting conditions. Further, the first proximal portion $P_{92}$ contacts the first structure pad 46.

In greater detail, a first electrode $E_1$ and a second electrode $E_2$ are arranged, respectively, underneath and above a part of the first deformable portion 92, and in direct contact with the latter, this part extending, in resting conditions, parallel to, and at a distance from, the top region surface $S_t$. The first and second electrodes $E_1$, $E_2$ perform the function of applying a voltage, in a per se known manner, on the aforementioned part of the first deformable portion 92 for bringing about deformation of the latter. For this purpose, the first and second electrodes $E_1$, $E_2$ are electrically connected, respectively, to the first structure pad 46 and to the second structure pad 47 (the latter connection not being shown in FIG. 14).

In use, the first and second probes 52, 54 apply a voltage between the first and second test pads 48, 50, and thus between the first and second structure pads 46, 47. Consequently, at least one part of the first deformable portion 92 is subjected to an electrical field and undergoes deformation so that the distal region $D_{92}$ bears upon the top region surface $S_t$, exerting on the membrane 10 a pre-set pressure. In a way similar to what has been described regarding the previous embodiments, it is thus possible to verify proper operation of the sensing structure 2.

According to a different embodiment (illustrated in FIG. 15), the sensing structure 2 comprises a beam 100, which has an elongated shape, has two ends constrained to the top region surface $S_t$ and includes a suspended portion, aligned to the corresponding ends and arranged, in resting conditions, above the membrane 10, at a distance from the latter.

The beam 100 is formed by the first and second deformable portions (designated, respectively, by 102 and 104), each of which in turn has the shape of a beam. Consequently, each one of the first and second deformable portions 102, 104 has an elongated shape, has two ends constrained, directly or indirectly, to the top region surface $S_t$, and includes a respective suspended portion, aligned to the corresponding ends and suspended, in resting conditions, above the membrane 10, at a distance from the latter. Without any loss of generality, the first and second deformable portions 102, 104 have, in top plan view, a same shape of rectilinear elongated element.

In greater detail, the first and second proximal ends of the first deformable portion 102, here designated by $P_{102a}$ and $P_{102b}$ respectively, are also in this case in electrical contact with the first and second structure pads 46, 47, respectively, which are arranged aligned in the direction of lengthening of the first deformable portion 102.

Figure 16:
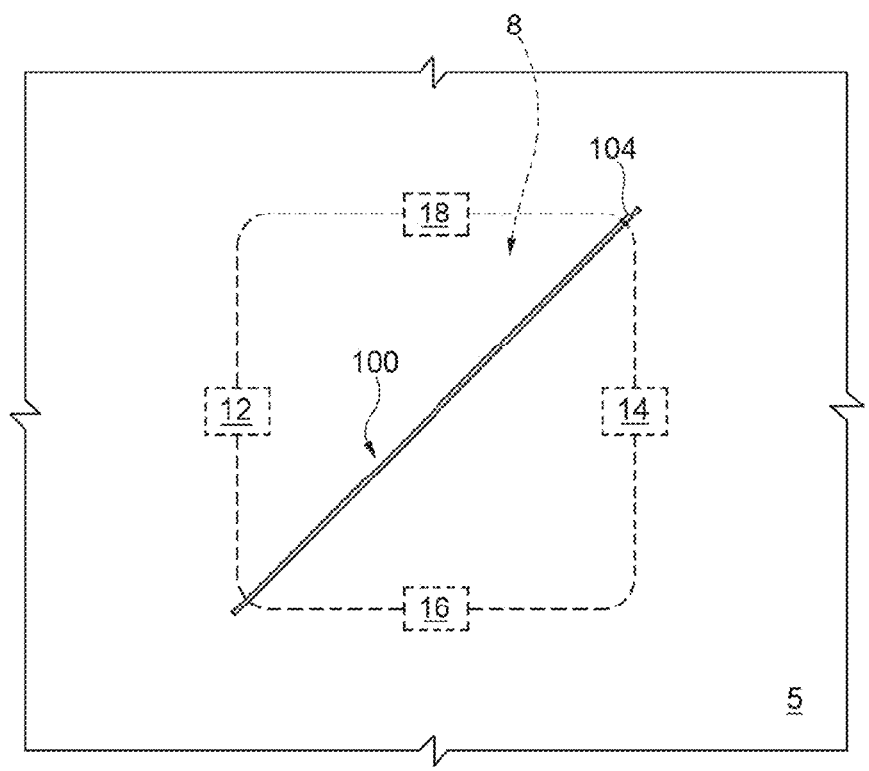

As illustrated in FIG. 16, in one embodiment the beam 100 extends, in top plan view, along a diagonal of the aforementioned rounded square. For simplicity of representation, among other things, no pad is illustrated in FIG. 16.

Figure 17:
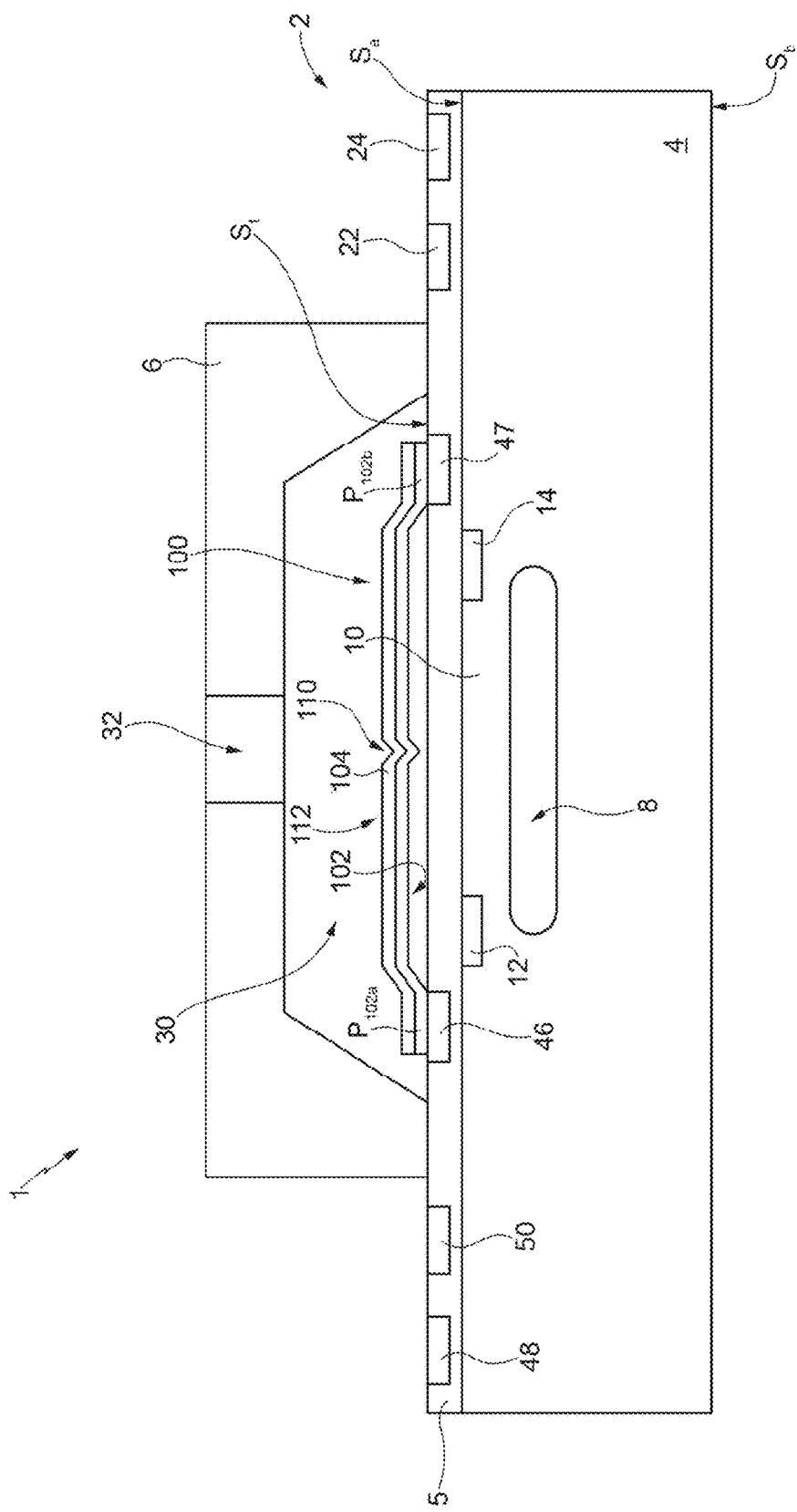

FIG. 17 shows an embodiment in which the beam 100 comprises an apex portion 110, which is, without any loss of generality, V-shaped. In particular, the apex portion 110 extends towards the membrane 10, starting from a horizontal portion 112 of the beam 100, which, in resting conditions, is parallel to the membrane 10. Further, in resting conditions, the apex portion 110 is arranged at a distance from the membrane 10 that is shorter than the distance between the horizontal portion 112 and the membrane 10 itself. Once again, in top plan view, the apex portion 110 overlies the center of the aforementioned rounded square.

For practical purposes, thanks to the presence of the apex portion 110, a reduced deformation of the beam 100 is sufficient to cause the apex portion 110 to exert a pressure on the membrane 10.

Figure 15:
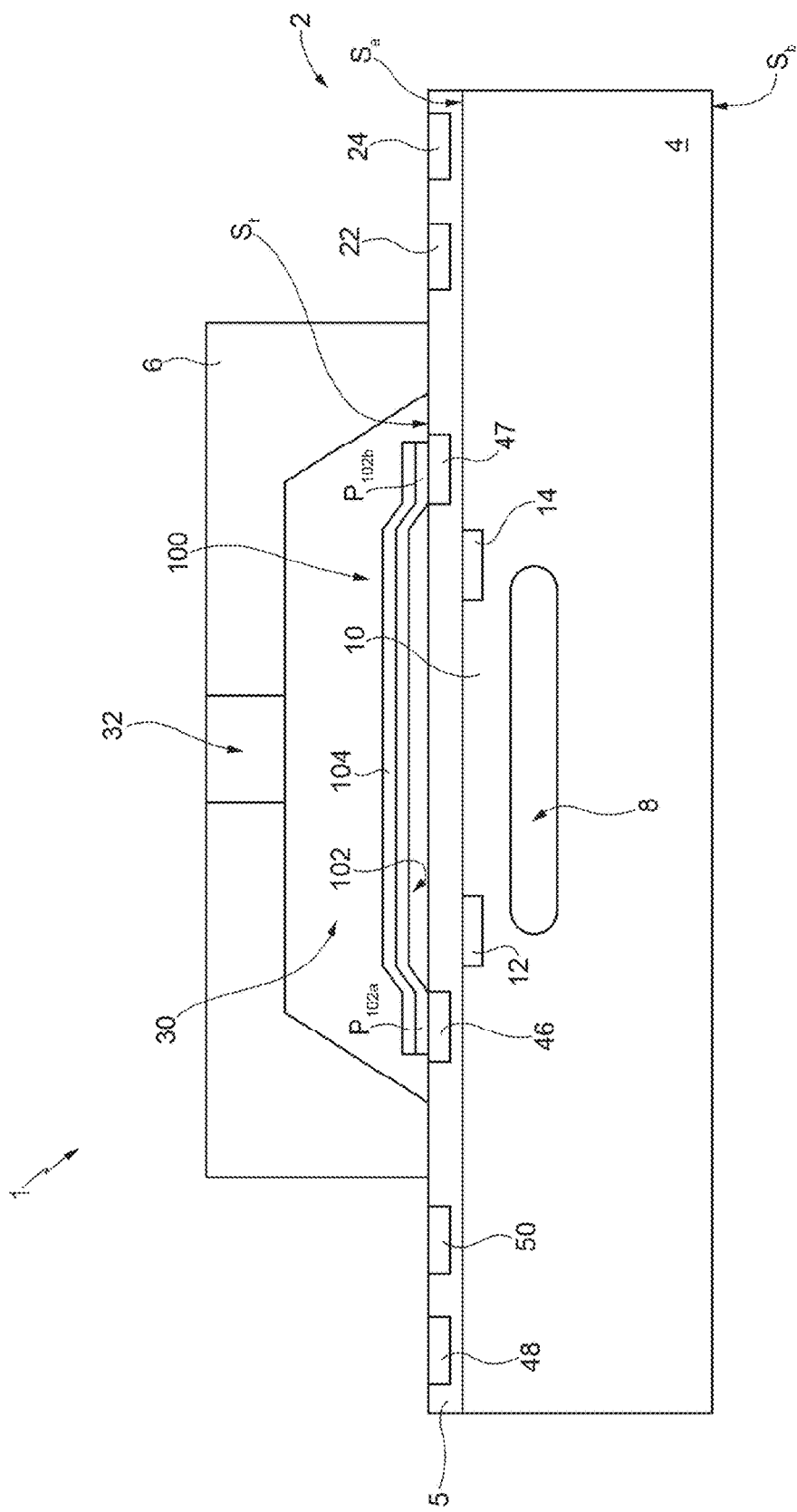

Once again with reference to the embodiments illustrated in FIGS. 15-17, and in particular with reference to the first and second deformable portions 102, 104, the teachings developed with reference to the previous figures still apply. Consequently, in the case where the increase in temperature of the beam 100 is induced electrically, at least one of the first and second materials is conductive in order to enable flow of the test current within the corresponding deformable portion of the beam 100. In particular, in the embodiments illustrated in FIGS. 15-17, the first material is conductive since the first and second structure pads 46, 47 contact the first deformable portion 102; there are, however, possible variants in which the first and second structure pads 46, 47 contact the second deformable portion 104, in which case the second material is conductive.

In the case where the increase in temperature of the beam 100 is induced from outside, for example via the thermal chuck 85, the first and second materials may both be non-conductive, and further the first and second test pads 48, 50 and the first and second structure pads 46, 47 may be absent.

In addition, even though not illustrated, it is possible for the sensing cavity not to be of a buried type, but rather open at the bottom. It is further possible for one or both of the first and second deformable portions 102, 104 to be at least in part of a piezoelectric material, as illustrated, for example, in FIG. 18.

Figure 18:
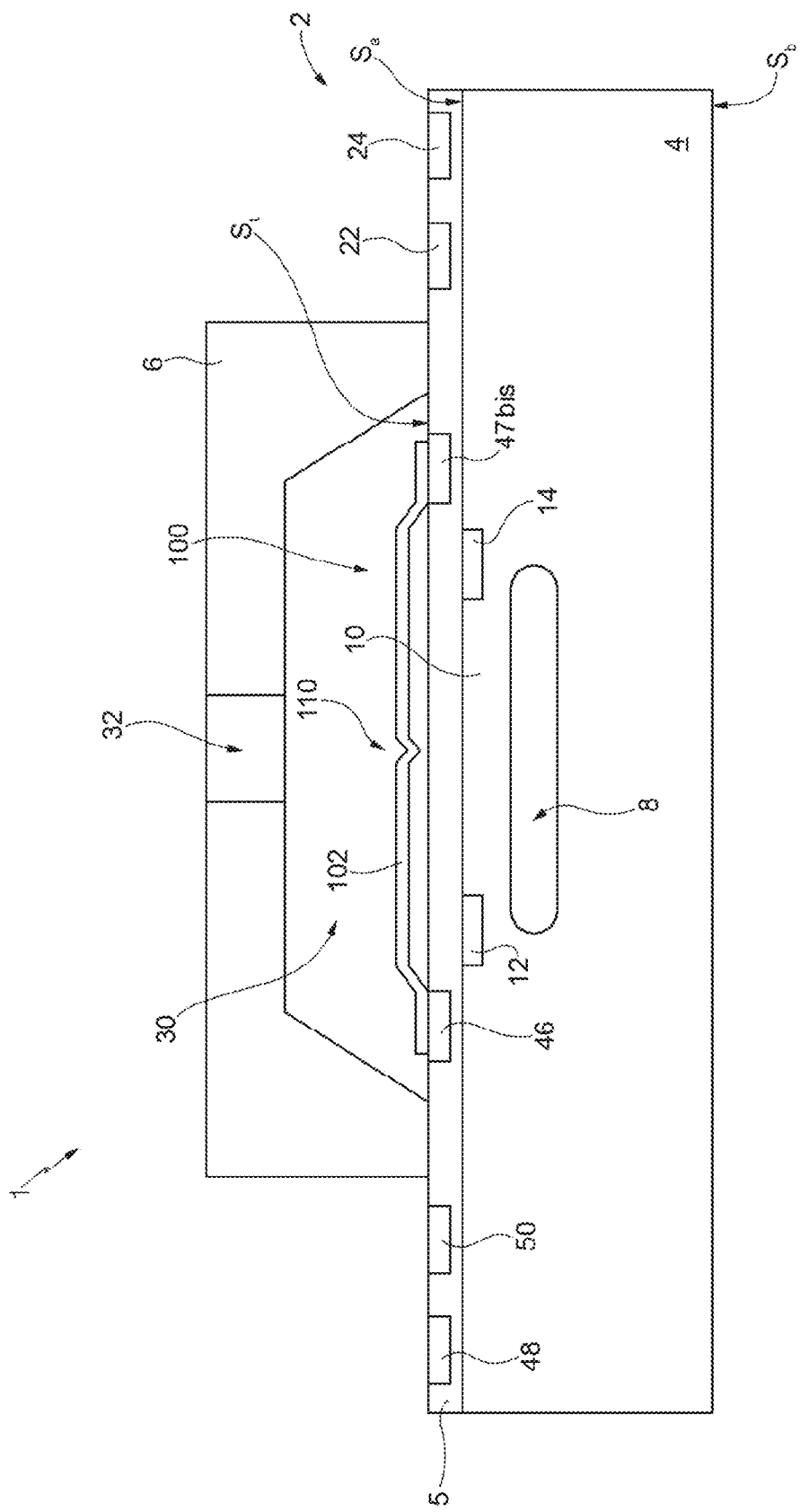

In detail, in the embodiment illustrated in FIG. 18, the first deformable portion 102 is of piezoelectric material. Consequently, as mentioned in connection with FIG. 14, also this embodiment may comprise electrodes (not shown), which may be biased, for example through the first structure pad 46 and a third structure pad 47bis.

Figure 19:
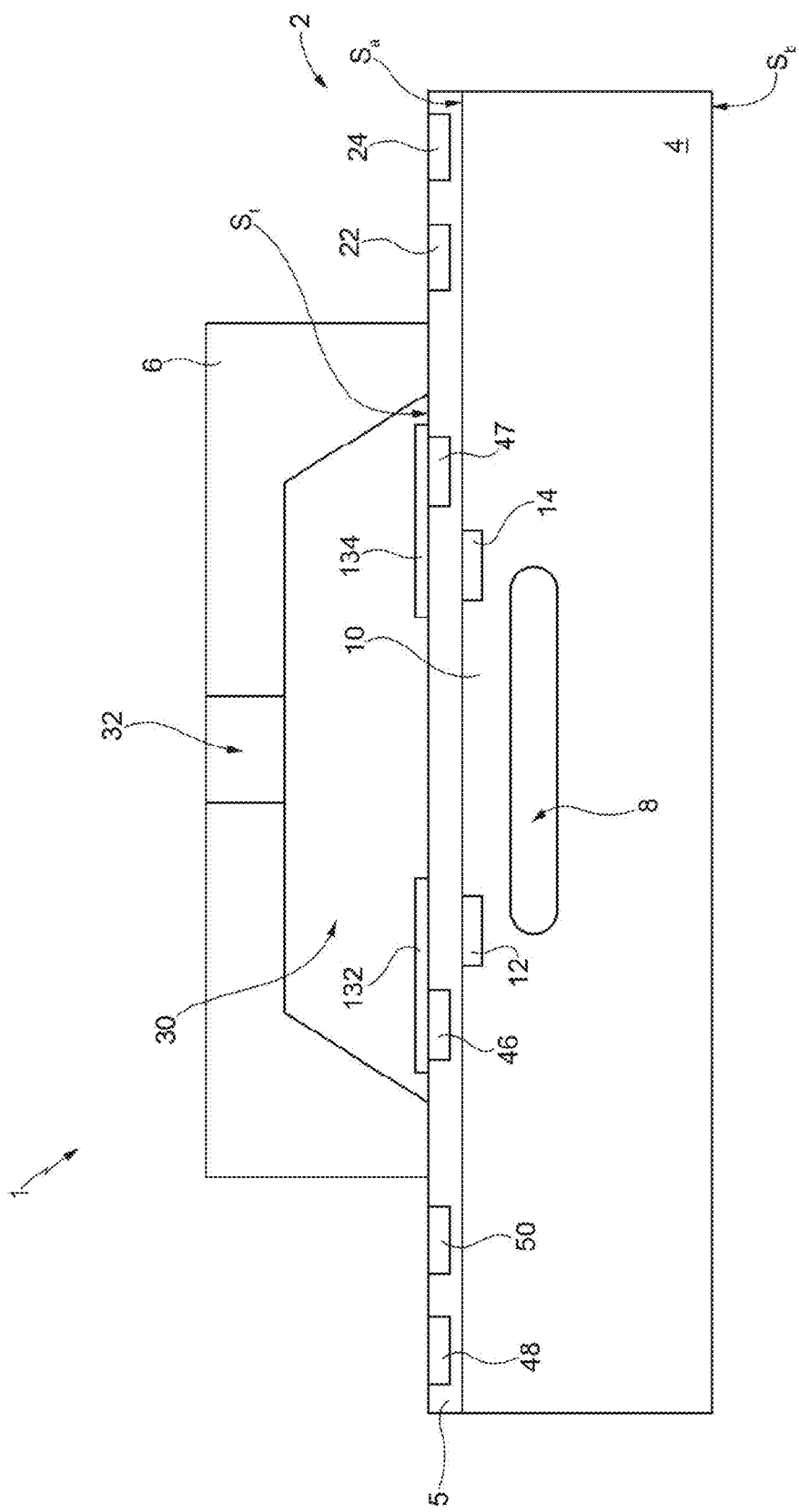

According to a different embodiment (illustrated in FIG. 19), the sensing structure 2 comprises a first deforming element 132 and a second deforming element 134, of piezoelectric material and arranged within the access cavity 30, above the top region 5, with which they are in direct contact. This enables simplification of the process of production of the deforming elements 132, 134. In this embodiment, the first and second structure pads 46, 47 are arranged in direct contact, respectively, with the first deforming element 132 and the second deforming element 134.

In use, through the first and second probes 52, 54 it is possible to apply corresponding voltages to the first and second deforming elements 132, 134, causing deformation thereof. In this way, the first and second deforming elements 132, 134 deform, in a controlled way, a portion of top region 5 arranged above the membrane 10, as well as the membrane 10 itself.

Figure 20:
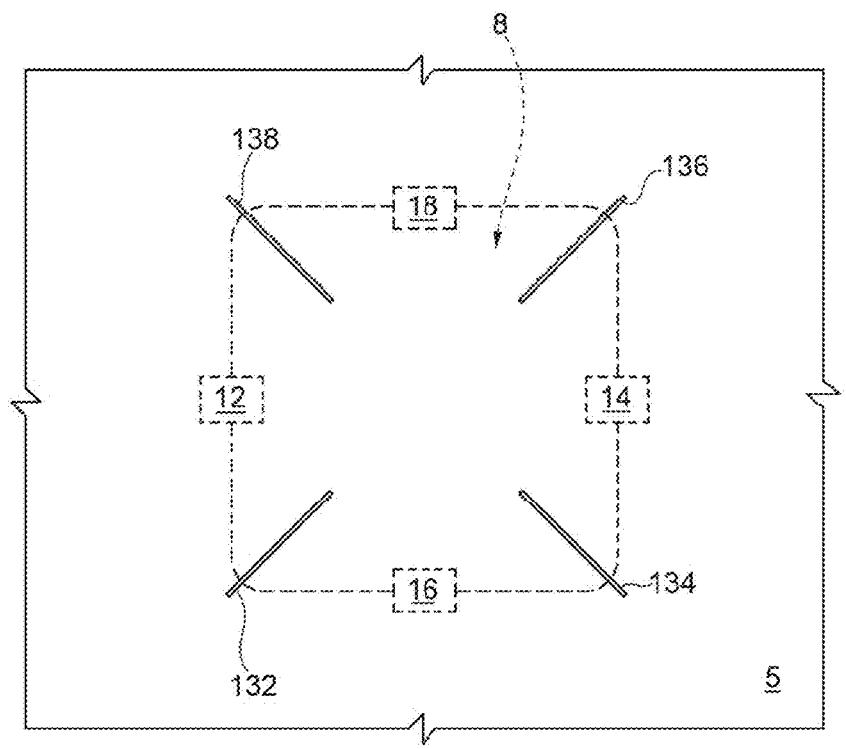

As illustrated in FIG. 20, it is further possible for the deforming elements to be in a number other than two. For instance, in the embodiment illustrated in FIG. 20, the sensing structure 2 also comprises a third deforming element 136 and a fourth deforming element 138, once again of piezoelectric material. Furthermore, the first, second, third, and fourth deforming elements 132, 134, 136, 138 each have an elongated shape. Once again, in top plan view, the first and third deforming elements 132, 136 are arranged along a first diagonal of the aforementioned rounded square, in a way specular with respect to the center of the rounded square, and in particular for overlying corresponding vertices of the rounded square, where by "vertex" is meant a point defined by the intersection between a diagonal of the rounded square and the perimeter of the rounded square. Likewise, the second and fourth deforming elements 134, 138 are arranged along a second diagonal of the rounded square, in a way specular with respect to the center of the rounded square, and in particular for overlying corresponding rounded vertices of the rounded square. Each one of the first, second, third, and fourth deforming elements 132, 134, 136, 138 contacts a corresponding structure pad (not shown) and may thus be set at a corresponding voltage through the use of probes.

Figure 21:
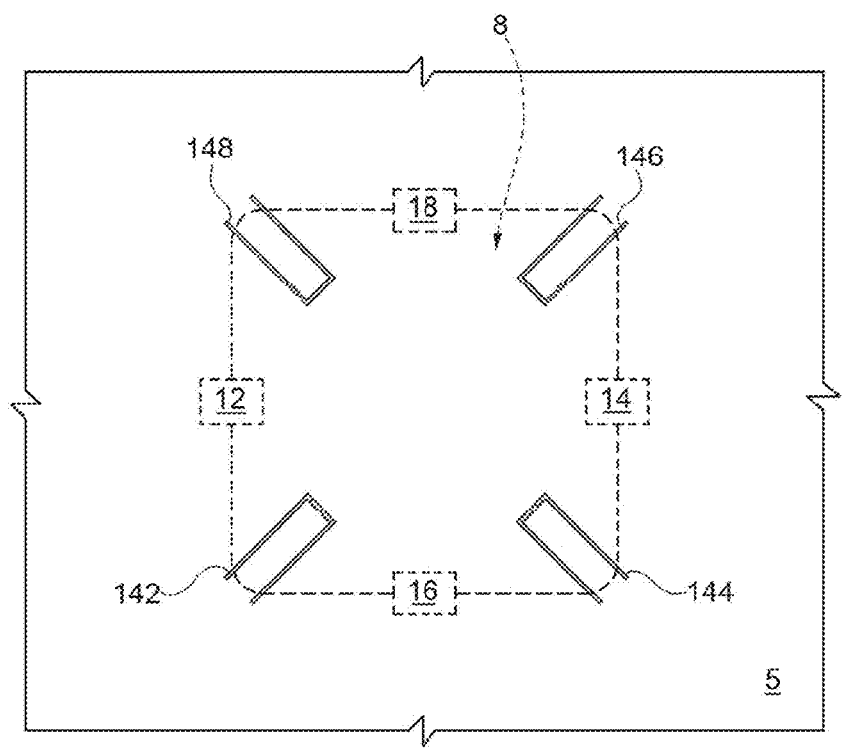

As illustrated in FIG. 21, it is further possible for the first, second, third, and fourth deforming elements (here designated, respectively, by 142, 144, 146, 148) to be each formed by a corresponding bimetallic strip of a planar type. In top plan view, each bimetallic strip is U-shaped. Consequently, each bimetallic strip is designed to be traversed by a current, which may be applied by a pair of corresponding structure pads (not shown), and to bend following upon the rise in temperature thus generated for exerting a pressure on the membrane 10. Also in this case, it is, however, possible for the increase in temperature to be induced from outside, for example through the thermal chuck 85.

In greater detail, each one of the first, second, third, and fourth deforming elements 142, 144, 146, 148 is arranged so that, in top plan view, the plane surface defined by the respective U shape is arranged on top of the corresponding vertex of the rounded square.

Figure 22A:
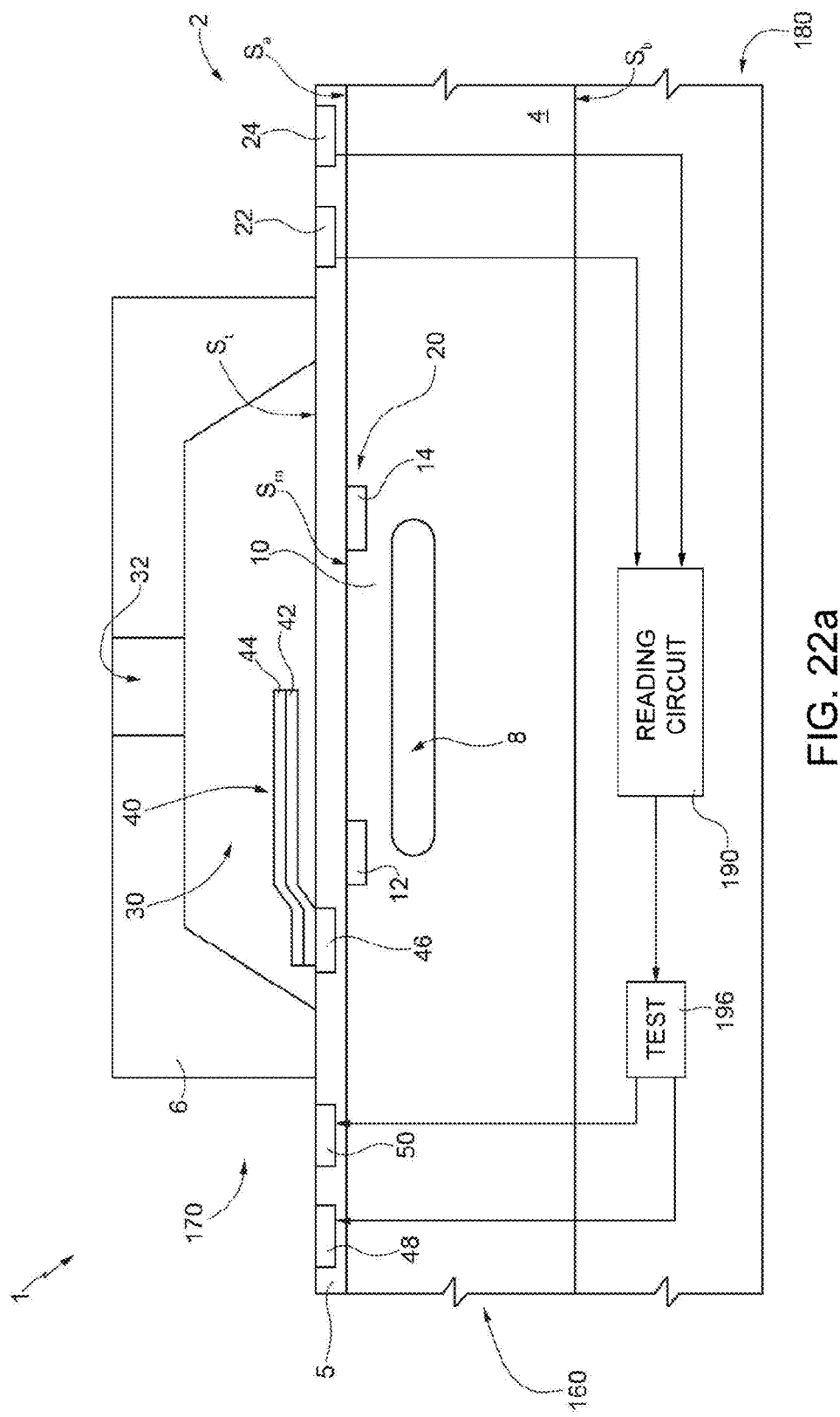
FIG. 22a shows a block diagram of a pressure sensor including the present sensing structure.

Irrespective of the details of implementation of the sensing structure 2, the pressure sensor 1 may be formed in a first die 160, a second die 170, and a third die 180, as illustrated in FIG. 22a, where, without this implying any loss of generality, the second die 170 is arranged above the first die 160, while the third die 180 is arranged underneath the first die 160. In particular, the semiconductor body 4, the top region 5, and the transduction circuitry 20 are formed in the first die 160, whereas the cap 6 is formed by the second die 170. The third die 180 forms an electronic reading circuit 190, which is electrically connected to the first and second interface pads 22, 24 for receiving the electrical transduction signal. The electronic reading circuit 190 may, for example, be a so-called ASIC (application-specific integrated circuit) and is designed to process the electrical transduction signal for generating a processed electrical signal.

As illustrated once again in FIG. 22a, it is further possible for a test circuit 196 also to be formed in the third die 180. In this case, the first and second test pads 48, 50 may be connected to the test circuit 196, for example by through silicon vias (TSVs) or wire bonding. There are in any case possible embodiments in which the test circuit 196 and/or the electronic reading circuit 190 are formed within the first die 160; in the case where both the test circuit 196 and the electronic reading circuit 190 are formed within the first die 160, the third die 180 may be absent.

Irrespective of the arrangement, the test circuit 196 is designed to carry out a closed-loop test on the pressure sensor 1; thus, it is designed to: i) apply a test signal to the first and second test pads 48, 50, and thus to the first and second structure pads 46, 47 for bringing about a pre-set deformation of the membrane 10; and ii) verify, by co-operating with the electronic reading circuit 190, that the electrical transduction signal assumes an expected value for verifying proper operation of the pressure sensor 1. It should further be noted that, even though in FIG. 22a reference is made, by way of example, to the case where the cantilever element 40 comprises the first and second deformable portions 42, 44, it is possible for the deformation of the membrane to be obtained by use of a different cantilever element, or else a beam, or else one or more deforming elements, as described with reference to any of the previous embodiments. Furthermore, the test circuit 196 may be electrically connected in a different way to the cantilever element, or else, according to the embodiment, to the beam, or else to the one or more deforming elements. For instance, the test circuit 196 may be connected directly to the first and second structure pads 46, 47, in which case the first and second test pads 48, 50 may be absent.

Figure 22B:
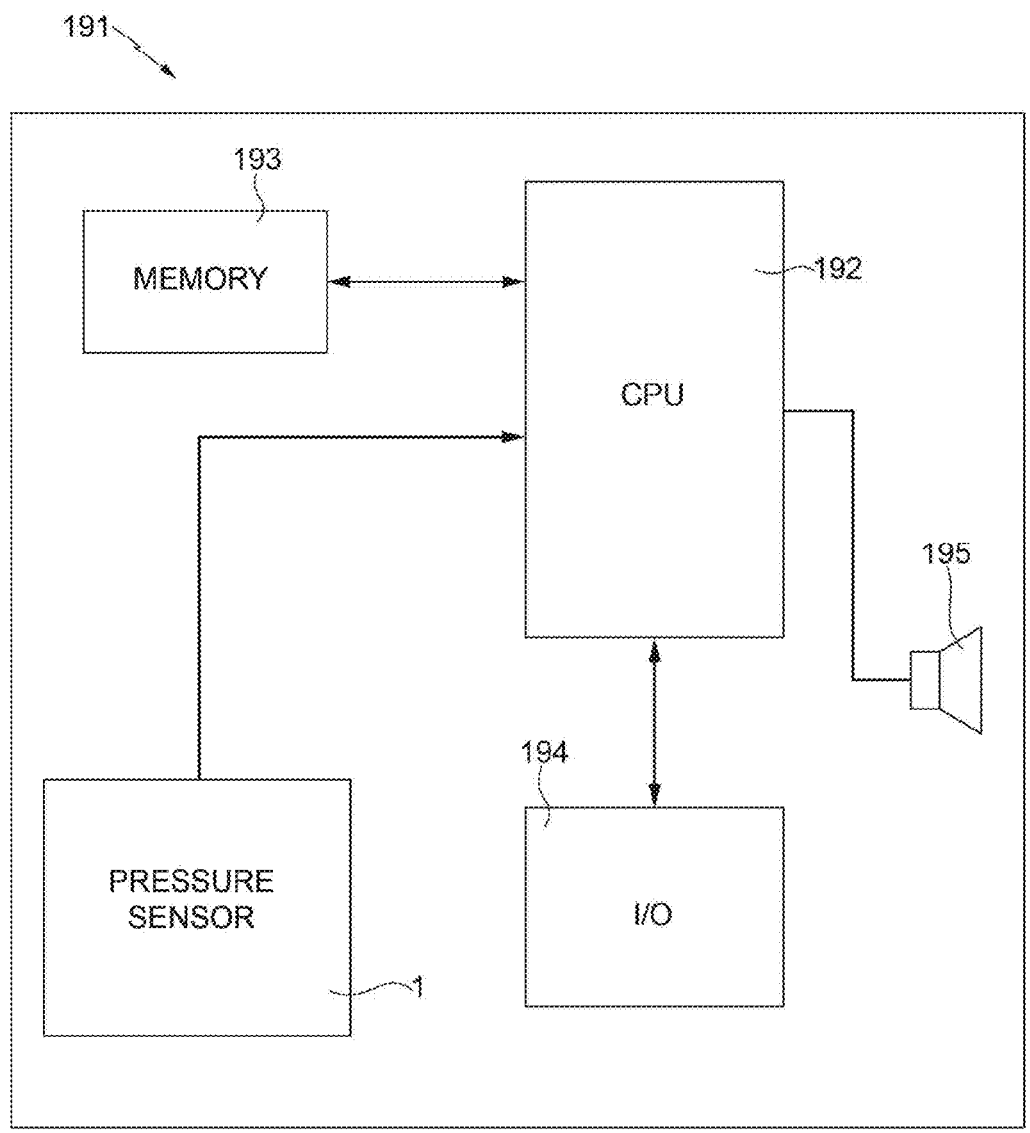

As illustrated in FIG. 22b, the pressure sensor 1 may in turn form an electronic system 191, such as for example a mobile communications device, a PDA (personal digital assistant), a notebook, a hearing-aid device, etc.

The electronic system 191 comprises a microprocessor 192, a memory block 193, connected to the microprocessor 192, and an input/output interface 194, for example equipped with a keypad and a screen, which is also connected to the microprocessor 192. The pressure sensor 1 sends the processed electrical signal to the microprocessor 192, possibly after prior processing by a further electronic interface circuit (not shown).

The electronic system 191 further comprises a transducer, formed, for example, by a speaker 195 designed to generate sounds. In this case, the pressure sensor 1 may function as microphone.

The present sensing structure may be produced by the manufacturing process described in what follows and illustrated in FIGS. 23-33. By way of example, the manufacturing process refers to the embodiment illustrated in FIG. 1.

Figure 23:
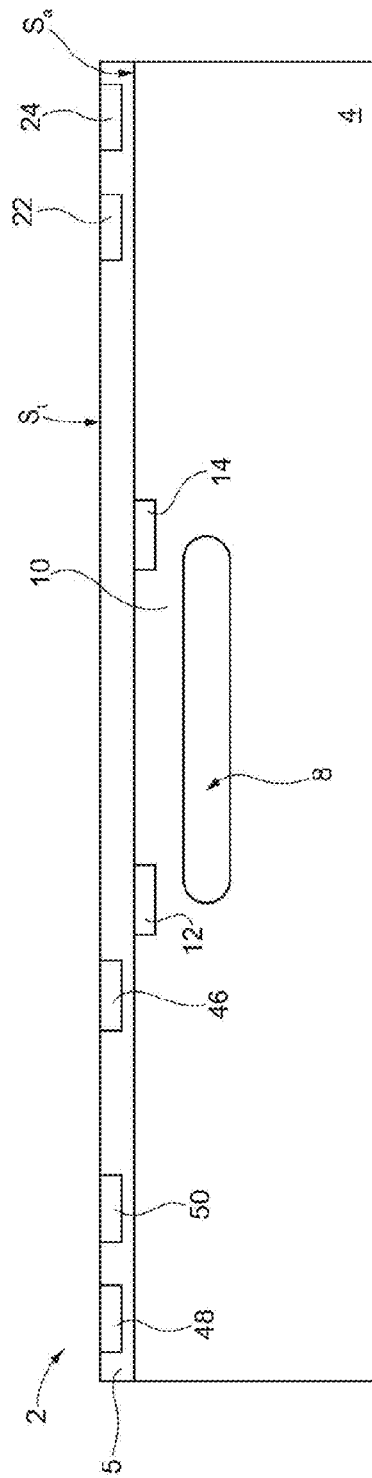

In detail, as illustrated in FIG. 23, there are formed the semiconductor body 4, the membrane 10, the top region 5, the sensing cavity 8, the first, second, third, and fourth piezoresistive elements 12-18, the first and second structure pads 46, 47 (the latter pad not being illustrated either in FIG. 23 or in the subsequent figures), as well as the first and second interface pads 22, 24 and the first and second test pads 48, 50.

Figure 24:
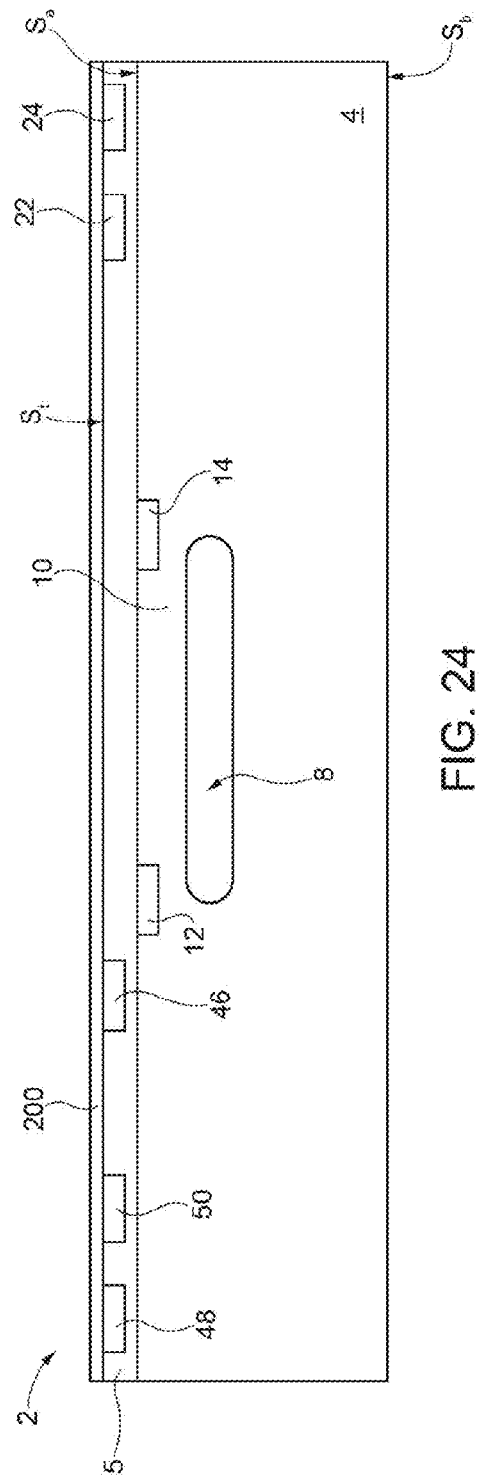

Next, as illustrated in FIG. 24, an oxide layer 200 is formed, for example by deposition, on the top region surface $S_t$. The oxide layer 200 may function at least in part as sacrificial layer, as described hereinafter; further, embodiments (not described any further herein) are possible in which, instead of the oxide layer 200, a different dielectric layer is formed.

Figure 25:
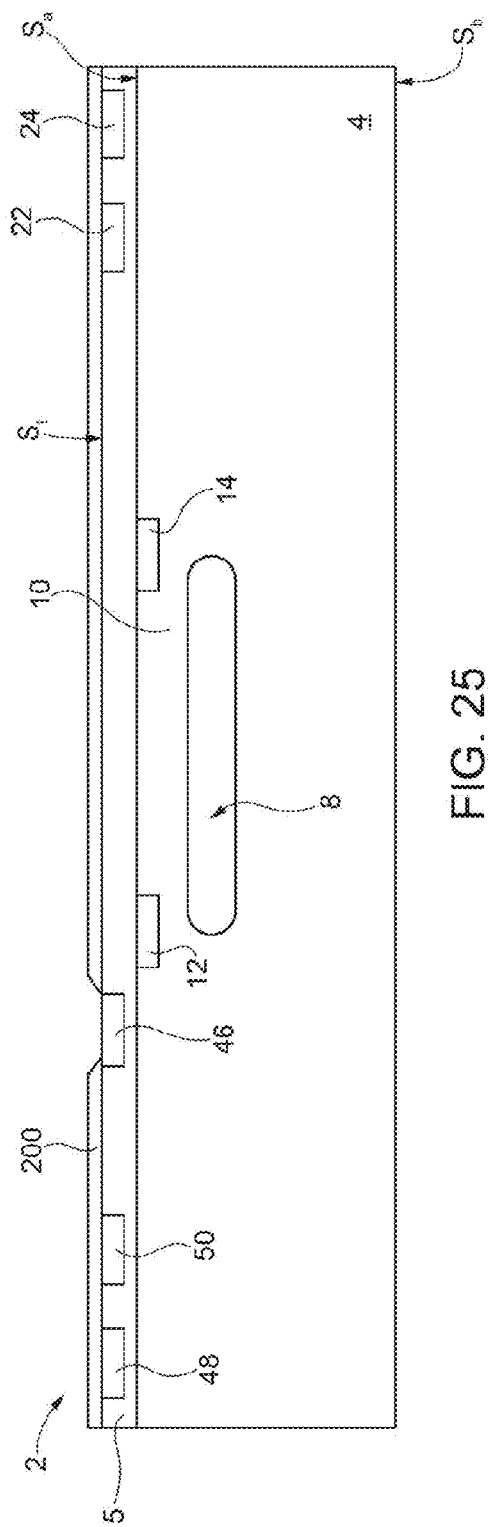

Next, as illustrated in FIG. 25, a process of masking and etching is carried out for removing portions of the oxide layer 200 above the first and second structure pads 46, 47, exposing the latter.

Figure 26:
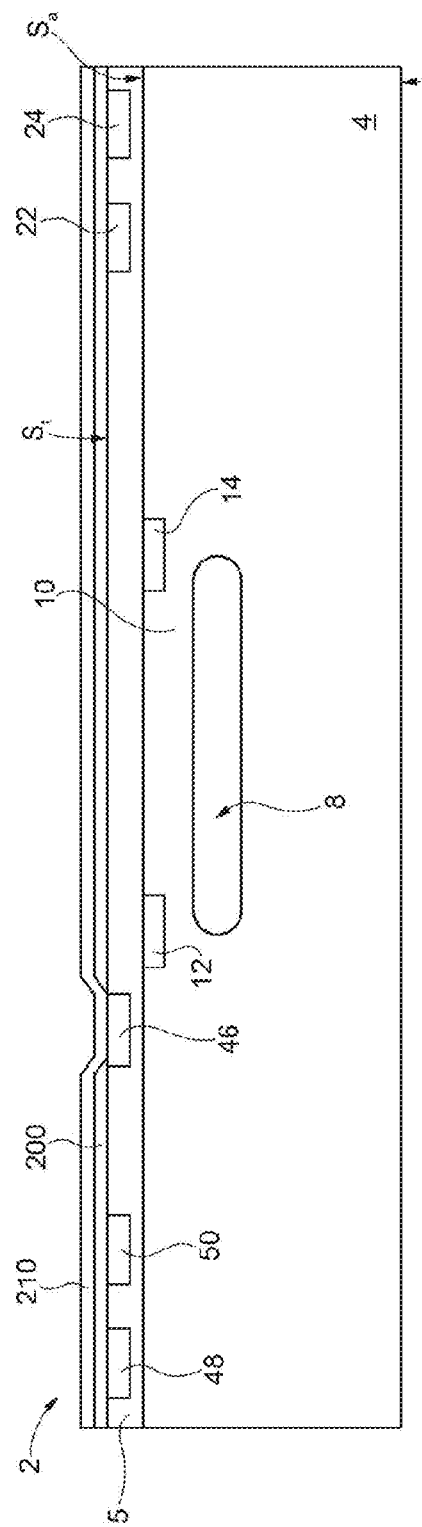

Then, as illustrated in FIG. 26, formed on the oxide layer 200 is a further layer, referred to herein as "first functional layer" 210. The first functional layer 210 is of the aforementioned first material.

Next, as illustrated in FIG. 27, on the first functional layer 210 a further layer is formed, referred to herein as "second functional layer" 220. The second functional layer 220 is of the aforementioned second material.

In greater detail, each one of the first and second functional layers 210, 220 may be obtained, for example, by chemical vapor deposition (CVD), or else by physical vapor deposition (PVD), or else by electrolytic plating, or electroless plating.

Next, as illustrated in FIG. 28, a process of masking and etching is carried out for removing portions of the first and second functional layers 210, 220 selectively and thus form the first and second deformable portions 42, 44.

Figures 29, 30:
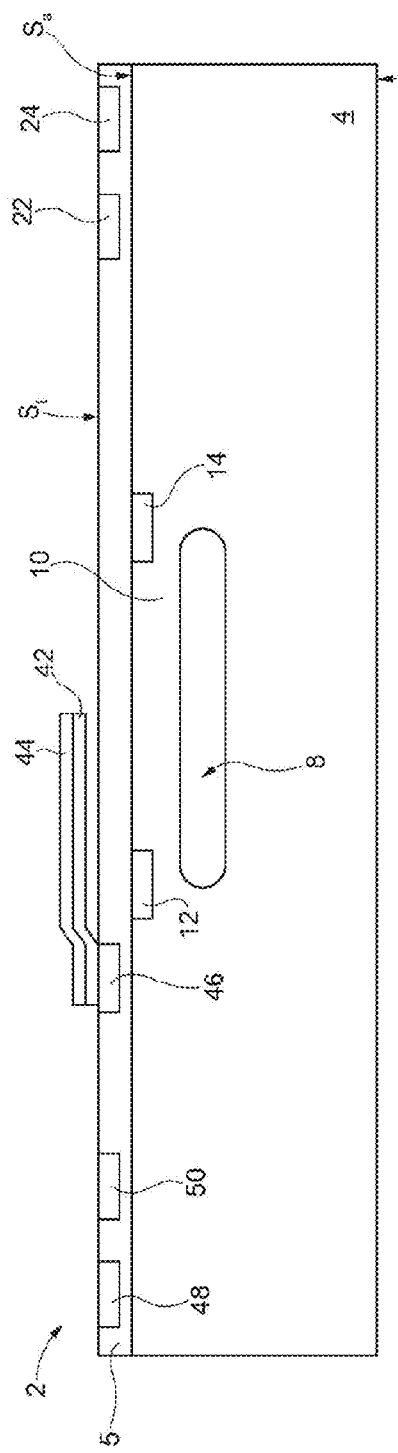

Then, as illustrated in FIG. 29, the oxide layer 200 is removed for freeing the distal regions of the first and second deformable portions 42, 44. This occurs in a per se known manner in the field of MEMS technologies, for example by carrying out an etching process.

Even though it is not shown, it is possible, with the use of a mask, for the removal of the oxide layer 200 to be only partial and thus, for example, for just a residual portion of the oxide layer 200 to remain underneath the first deformable region 42 in contact with the first and second inclined regions $I_{42a}$, $I_{42b}$.

Then, the sensing structure 2 is completed in a per se known manner.

The manufacturing process described may be applied, with corresponding variations, also in the case where the first deformable portion is of piezoelectric material and the second deformable portion is absent, as well as in the case where, instead of the cantilever element 40, the beam 100 is present.

As regards the embodiment illustrated in FIG. 10, it may be obtained by carrying out the operations illustrated in FIG.

23, except that, during these operations, the first and second test pads 48, 50 and the first and second structure pads 46, 47 are not formed.

Following upon execution of the operations illustrated in FIG. 23, the first functional layer 210 is formed on the top region 5, and the second functional layer 220 is formed on the first functional layer 210, as illustrated in FIG. 30.

Figure 31:
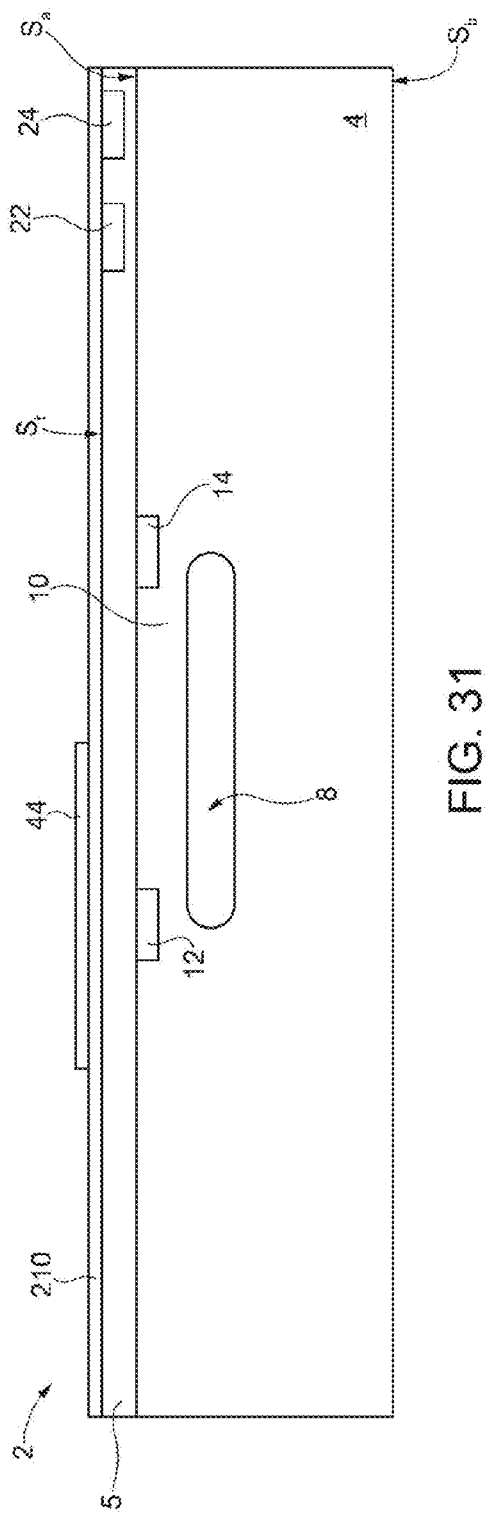

Next, as illustrated in FIG. 31, a process of masking and etching is carried out for removing selectively portions of the second functional layer 220 and form the second deformable portion 44.

Figure 32:
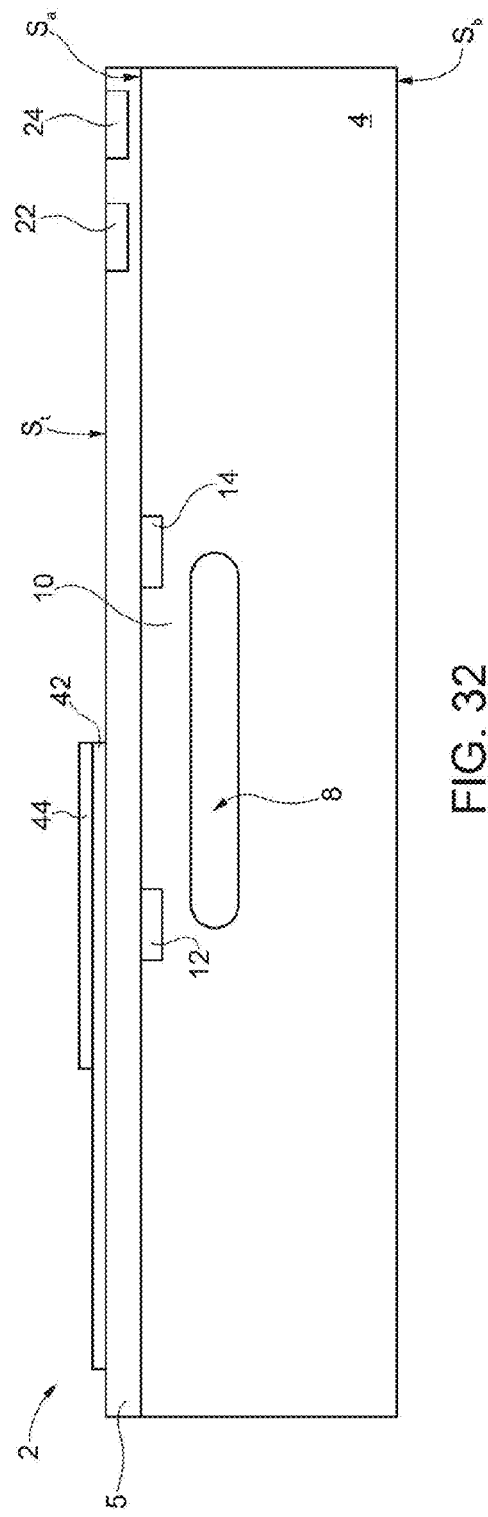

Then, as illustrated in FIG. 32, a process of masking and etching is carried out for removing selectively portions of the first functional layer 210 and form the first deformable portion 42.

Figure 33:
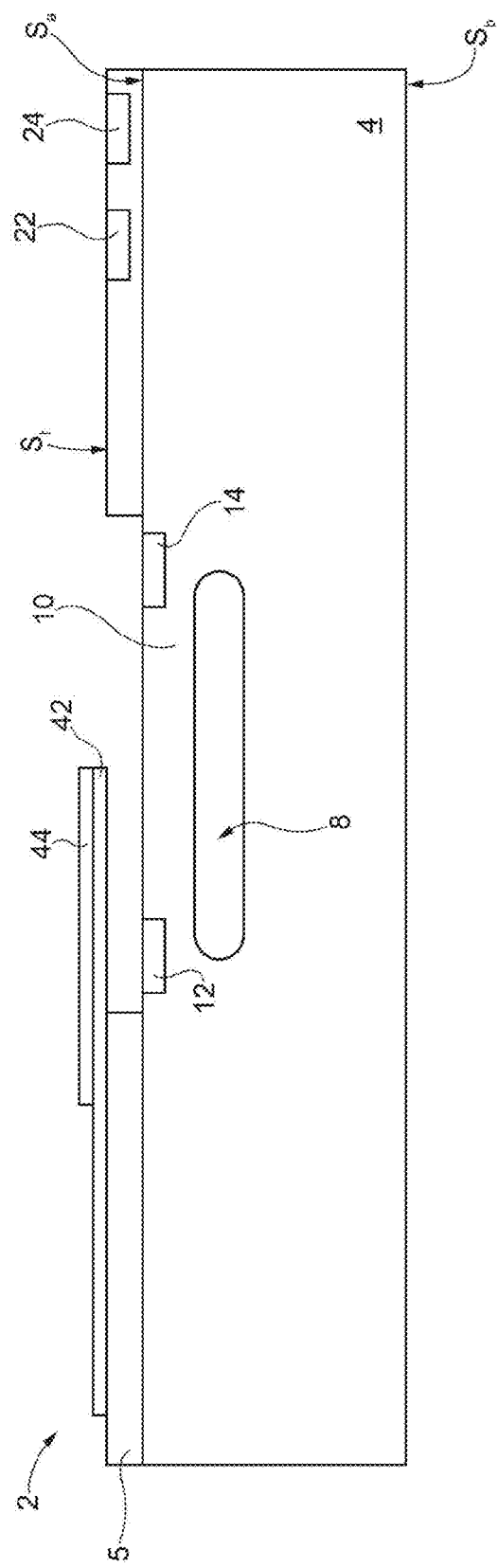

Next, as illustrated in FIG. 33, via a process of masking and etching, portions of the top region 5 are removed for freeing the distal regions of the first and second deformable portions 42, 44. For example, an etching process may be carried out. Finally, the sensing structure 2 is completed in a per se known manner.

The operations referred to in FIGS. 30-33 may be modified, for example by adopting a first functional layer of piezoelectric material, in which case the second functional layer may not be formed. In this way, an embodiment (not shown) of the type illustrated in FIG. 10 is obtained, where the cantilever element is of piezoelectric material. In this case, in a per se known manner, two electrodes are formed in contact with the cantilever element, these electrodes being electrically accessible from outside the cap 6 and enabling application of a voltage to at least one part of the cantilever element to cause deformation thereof.

From what has been described and illustrated previously, the advantages that the present solution affords are evident.

In detail, the present sensing structure has a built-in self-test (BIST) structure, which comprises an actuator (for example, the cantilever element 40, the beam 100, or else one of the deforming elements 132-138 and 142-148). The actuator may be controlled, i.e., actuated, in a first operating mode, where it is arranged at a distance from a membrane region, which comprises the membrane 10, and in a second operating mode, where it contacts this membrane region and exerts a mechanical force on the membrane for bringing about a corresponding deformation of the membrane and consequent generation of a corresponding sensing signal, which may be analyzed for verifying operation of the sensing structure.

In practice, the built-in self-test structure enables exertion on the membrane 10 of a force, and thus a pressure, of a pre-set value, in a way controlled and independent of the pressure present on the outside of the sensing structure. In this way, it is effectively possible to test the sensing structure.

The present sensing structure further enables testing to be carried out both in the final stage of application and during the manufacturing process, for example in the so-called steps of electrical wafer sorting and final testing.

Furthermore, the present sensing structure enables characterization and calibration of the pressure sensor in a repeatable and reliable way since the pressure sensor is stimulated mechanically always by a same actuator.

In addition, the present sensing structure may be tested using standard test systems, which are particularly simple, inexpensive, and such as to enable parallelization of tests made on a large number of sensing structures.

In conclusion, it is clear that modifications and variations may be made to what has been described and illustrated herein, without thereby departing from the scope of the present disclosure.

For instance, the transduction circuitry 20 may be different from what has been illustrated and described herein. For example, instead of the piezoresistive elements 12-18, it is possible for the transduction circuitry 20 to comprise a first plate and a second plate of a capacitor with variable capacitance, this capacitance indicating the pressure exerted on the membrane. In any case, the sensing structure 2 is designed to vary an electrical quantity as a function of the pressure that acts on the pressure sensor 1, and in particular on the membrane 10.

Once again with reference to the case where the piezoresistive elements 12-18 are present, they may be present in a number other than four. Further, one or more of the piezoresistive elements may be electrically separated from the membrane 10, as well as from the semiconductor body 4, for example by interposition of one or more insulating layers (not shown). Once again, the arrangements with respect to the piezoresistive elements 12-18 of the cantilever element 40, the beam 100, and one or more of the deforming elements 132-138, 142-148 may differ from what has been described.

Furthermore, it is possible for the membrane 10 to be of a non-semiconductor material and for the sensing cavity 8 to be delimited only in part by the semiconductor body 4. In turn, the sensing cavity 8 may have a shape, in top plan view, different from what has been described, such as for example a circular shape, or else the shape of a polygon with smoothed (for example rounded) vertices.

In addition, in each of the embodiments described, at least one part of the top region 5, arranged above the membrane 10, may be removed, in which case the cantilever element 40 or else the beam 100 may come to bear directly upon the membrane 10. Further possible are embodiments in which the top region 5 is absent.

It is further possible for the cap 6 and the electronic reading circuit 190 to be formed in a same die, in which case the pressure sensor 1 is formed by two dice; in addition, it is possible for also the test circuit 196 to be formed within the die that forms the cap 6.

Finally, details described with reference to given embodiments may be implemented in other embodiments. In this connection, purely by way of example, embodiments are possible of the type illustrated in FIG. 10, where the cantilever element 40 comprises an apex portion.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensing structure, comprising:
a membrane region including a membrane that is configured to undergo deformation as a function of a pressure; and
a first actuator that is configured to be controlled in a first operating mode and a second operating mode, the first actuator, in the second operating mode, being configured to deform and contact the membrane region.

2. The sensing structure according to claim 1, further comprising a test structure including the first actuator and transduction circuitry, the transduction circuitry configured to vary at least one electrical quantity as a function of deformation of the membrane.

3. The sensing structure according to claim 1 wherein the first actuator includes a first deformable portion and a second deformable portion made of a first material and a second material, respectively, the first and second materials having coefficients of thermal expansion that are different from one another.

4. The sensing structure according to claim 1, further comprising a semiconductor body, the membrane being of semiconductor material, the first actuator having a first end and a second end connected to the semiconductor body.

5. The sensing structure according to claim 1 wherein the first actuator, in the first operating mode, is arranged at a distance from the membrane region.

6. The sensing structure according to claim 1, further comprising a semiconductor body having a surface, the first actuator including a suspended portion, which extends parallel to the surface, and an apex portion, which extends from the suspended portion to the surface.

7. The sensing structure according to claim 1, further comprising a plurality of piezoresistive elements positioned around a center of the membrane region, the first actuator, in the second operating mode, contacting the center of the membrane region.

8. The sensing structure according to claim 1 wherein the first actuator is in direct contact with the membrane region both when in the first operating mode and in the second operating mode.

9. The sensing structure according to claim 1, further comprising:
a first cavity positioned below the membrane; and
a cap coupled to the membrane region and forming a second cavity, the first actuator extending at least in part within the second cavity.

10. The sensing structure according to claim 9 wherein the first actuator includes an electrically conductive part that extends outside of the second cavity.

11. A process for manufacturing a sensing structure, comprising:
forming a membrane region including a membrane that is configured to undergo deformation as a function of a pressure; and
forming an actuator that is configured to be controlled in a first operating mode and a second operating mode, the actuator, in the second operating mode, being configured to deform and contact the membrane region.

12. The process of claim 11, further comprising:
positioning a cap over the membrane region and over the actuator; and
coupling a test circuit to the actuator.

13. A device, comprising:
a substrate;
a membrane region in the substrate, the membrane region including a first cavity and a membrane overlying the first cavity; and
a first actuator including a first portion on the substrate and a second portion overlying the first cavity.

14. The device of claim 13, further comprising a plurality of piezoresistive elements in the substrate, the plurality of piezoresistive elements overlying edges of the first cavity.

15. The device of claim 13 wherein the first actuator extends over a corner of the first cavity.

16. The device of claim 13 wherein the first actuator extends over a side of the first cavity.

17. The device of claim 13 wherein the first actuator is on a first side of the substrate, and the cavity is open on a second side, opposite to the first side, of the substrate.

18. The device of claim 13, further comprising a cap on the substrate, the cap forming a second cavity, the second portion of the first actuator being positioned in the second cavity.

19. The device of claim 18 wherein the cap includes a through hole that overlies the first cavity.

20. The device of claim 19, further comprising a diaphragm overlying the through hole.

21. The device of claim 18 wherein the first portion of the first actuator is positioned outside of the second cavity.

22. The device of claim 13 wherein the first actuator includes a third portion on the substrate, the second portion positioned between the first portion and the third portion, the first cavity positioned between the first portion and the third portion.

23. The device of claim 13, further comprising a second actuator, the second actuator including a first portion on the substrate and a second portion overlying the first cavity.

24. The device of claim 13 wherein the first and second portions of the first actuator are coplanar.

25. The device of claim 13 wherein the first actuator includes a third portion overlying the first cavity, a fourth portion overlying the first cavity, and a fifth portion on the substrate, the third portion physically coupling the second portion to the fourth portion, the second and fourth portions extending in a first direction, the third portion extending in a second direction that is substantially perpendicular to the first direction.

* * * * *